US012541555B2

(12) United States Patent
Vadapandeshwara et al.

(10) Patent No.: US 12,541,555 B2
(45) Date of Patent: Feb. 3, 2026

(54) DECLARATIVE MODELING PARADIGM FOR GRAPH-DATABASE

(71) Applicant: Oracle Financial Services Software Limited, Goregaon (IN)

(72) Inventors: Rajaram Narasimha Vadapandeshwara, Bangalore (IN); Jesna Jacob, Bangalore (IN); Tara Kant, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 0 days.

(21) Appl. No.: 18/355,568

(22) Filed: Jul. 20, 2023

(65) Prior Publication Data

US 2024/0061883 A1    Feb. 22, 2024

Related U.S. Application Data

(60) Provisional application No. 63/373,181, filed on Aug. 22, 2022.

(51) Int. Cl.
*G06F 16/90* (2019.01)
*G06F 3/0486* (2013.01)
*G06F 16/901* (2019.01)

(52) U.S. Cl.
CPC ........ *G06F 16/9024* (2019.01); *G06F 3/0486* (2013.01)

(58) Field of Classification Search
CPC .................................................. G06F 16/9024
See application file for complete search history.

(56) References Cited

U.S. PATENT DOCUMENTS

| 2009/0055838 | A1* | 2/2009 | Sedukhin | G06F 11/3612 |
| | | | | 719/318 |
| 2010/0088665 | A1* | 4/2010 | Langworthy | G06F 8/43 |
| | | | | 717/104 |
| 2010/0088666 | A1* | 4/2010 | Box | G06F 8/42 |
| | | | | 717/104 |
| 2012/0179430 | A1* | 7/2012 | Aish | G06F 8/34 |
| | | | | 703/1 |
| 2014/0172914 | A1* | 6/2014 | Elnikety | G06F 16/9024 |
| | | | | 707/774 |

(Continued)

*Primary Examiner* — Mohammad S Rostami
(74) *Attorney, Agent, or Firm* — Kilpatrick Townsend & Stockton LLP

(57) ABSTRACT

Disclosed herein is a declarative modeling paradigm for a graph model, graph-physicalization, delta load/offload, automatic generation of sub-graphs based on user entitlements, a graph-pipeline for low-code graph file formats, and machine-learning pipeline for analysis of the graph model. In a particular aspect, a computer-implemented process includes generating a graphical user interface comprising one or more tools configured to allow a user to build and visualize a graph model based on data, obtaining the data from one or more sources, receiving input from the user via the graphical user interface, where the input comprises a request to create at least two nodes representing logical entities within the data and at least one edge representing one or more relationships between the logical entities, generating the graph model based on the input from the user, analyzing the data using the graph model, and output results based on the analyzing.

18 Claims, 14 Drawing Sheets

(56) References Cited

U.S. PATENT DOCUMENTS

| | | | |
|---|---|---|---|
| 2017/0123950 A1* | 5/2017 | Payette | G06F 8/656 |
| 2018/0121501 A1* | 5/2018 | Vaquero Gonzalez | G06F 16/284 |
| 2019/0332698 A1* | 10/2019 | Cho | G06F 16/2393 |
| 2020/0105255 A1* | 4/2020 | Huang | G06F 16/3334 |
| 2020/0134477 A1* | 4/2020 | Lee | G06N 5/022 |
| 2020/0210869 A1* | 7/2020 | Anicic | G06F 16/258 |
| 2020/0285944 A1* | 9/2020 | Lee | G06F 16/9024 |
| 2021/0042589 A1* | 2/2021 | Tokarev Sela | G06F 16/904 |
| 2021/0073338 A1* | 3/2021 | Dounis | G06N 3/006 |
| 2021/0132777 A1* | 5/2021 | Zenger | G06Q 10/067 |
| 2021/0232579 A1* | 7/2021 | Schechter | G06F 16/254 |
| 2022/0014555 A1* | 1/2022 | Crabtree | H04L 63/1441 |
| 2022/0365976 A1* | 11/2022 | Dudkiewicz | G06F 16/24578 |
| 2023/0065398 A1* | 3/2023 | Purdy | H04L 63/1433 |
| 2023/0086327 A1* | 3/2023 | Song | G06F 16/242 382/159 |
| 2023/0140169 A1* | 5/2023 | Armbrust | G06F 16/245 707/798 |
| 2023/0153581 A1* | 5/2023 | Gandhi | G06Q 10/0837 706/11 |
| 2023/0196138 A1* | 6/2023 | McKay | G06F 16/906 706/12 |
| 2023/0252044 A1* | 8/2023 | Klein | G06F 16/27 707/634 |
| 2023/0376826 A1* | 11/2023 | Au | G06N 3/045 |
| 2024/0004931 A1* | 1/2024 | Vangala | G06F 16/9024 |

\* cited by examiner

DECLARATIVE MODELING PARADIGM FOR GRAPH-DATABASE

CROSS-REFERENCE TO RELATED APPLICATION

The present application is a non-provisional application of and claims the benefit and priority under 35 U.S.C. 119(e) of U.S. Provisional Application No. 63/373,181, filed Aug. 22, 2022, the entire disclosure of which is incorporated by reference herein for all purposes.

FIELD

The present disclosure relates generally to graph data modeling, and more particularly, to a declarative modeling paradigm for a graph model, graph-physicalization, delta load/offload, automatic generation of sub-graphs based on user entitlements, a graph-pipeline for low-code graph file formats, and a machine-learning pipeline for analysis of the graph model.

BACKGROUND

Data modeling is the translation of a conceptual view of data to a logical model. In the graph world, graph data models make it possible to rethink the representation of data models. Graph data modeling is the process in which a user describes an arbitrary domain as a connected graph of nodes and relationships with properties and labels. During the graph data modeling process, a user decides which entities within a dataset should be nodes, which should be links, and which should be discarded. Nodes (also known as vertices) are the fundamental units of the dataset. Links (also known as edges) are the relationships between nodes. Properties are descriptive characteristics of nodes and links but are not important enough to become nodes or links themselves. The result of the data modeling process is a blueprint of the dataset's entities, relationships, and properties thereof. The blueprint can then be used to create a visualization model for consumption and analysis of the dataset. Graph data modeling and analytics has gained popularity due to its growing applicability across various domains including social networks, market influencer analysis, bioinformatics, criminology, machine learning, and data mining. Several large-scale graph processing systems have been developed to enable efficient graph analysis across shared memory and distributed platforms.

Key challenges with graph data modeling have been with the encoding format for data, how to interface with multiple data-sources with uniform semantics declaratively, lack of visual declarative design approach to identifying entities, their relationships and rules to generate vertices, edges, rationale to determine how these are populated, managed, handling of delta load, sub-graphs, merging nodes based on matching criteria to generate unique node and ability to define execution semantics with solve-order among various tasks to generate in-memory graph. There is not a non-programmatic paradigm to support all of the above in an integrated light-weight solution that has light tech footprint. After addressing the building block challenges mentioned above, the ability to generate models for graph analytics through the use of a low-code/no-code development platform is an area that has not received attention or has hitherto been considered difficult to conceptualize. Almost all occurrences of graph-model design, models for graph-analytics and GraphML (file format) have been code heavy or black-boxes. Embodiments described herein address these and other problems, individually and collectively.

SUMMARY

Techniques are provided (e.g., a method, a system, non-transitory computer-readable medium storing code or instructions executable by one or more processors) for declarative modeling processes applicable to graph model such as graph-database or GraphDB, graph-physicalization, delta load/offload, automatic generation of sub-graphs based on user entitlements, a graph-pipeline for low-code file formats such as GraphML, and a machine-learning pipeline for analysis of the graph model.

In various embodiments, a computer-implemented method is provided that comprises: generating, by a data processing system, a graphical user interface for implementing a declarative modeling application, wherein the graphical user interface comprises one or more tools configured to allow a user to build and visualize a graph model using declarative modeling; obtaining, by the data processing system, data for the graph model from one or more sources based on input from the user received via the graphical user interface; receiving, by the data processing system, declarative modeling input from the user via the graphical user interface, wherein the input comprises a request to create at least two nodes representing logical entities within the data and at least one edge representing one or more relationships between the logical entities, wherein the request specifies types of nodes and edges for the at least two nodes and the at least one edge, attributes or properties for the at least two nodes and the at least one edge, and constraints on the relationships between the logical entities, and wherein the request specifies constraints on a layout of the graph model including an arrangement of the at least two nodes and the at least one edge in a visual representation; generating, by the data processing system, the graph model based on declarative modeling input from the user and the data for the graph model, wherein the generating comprises: extracting information from the declarative modeling input to define a graph structure, the extracting includes identifying the types, the attributes or properties, and the constraints for the at least two nodes and the at least one edge specified by the user; connecting the at least two nodes and the at least one edge to the one or more sources via one or more data pipelines based on the data used for the attributes or properties and relationships of the at least two nodes and the at least one edge specified by the user; and creating the at least two nodes and the at least one edge of the graph model, wherein each node is instantiated with the attributes or properties, and the at least one edge is established based on the relationship between the at least two nodes; and rendering the graph model in the graphical user interface.

In some embodiments, the computer-implemented method further comprises: analyzing, by the data processing system, the data using the graph model, wherein the analyzing comprises: (i) executing rules on the data based on the at least two nodes and the at least one edge and obtaining information for a task based on the rules, the data, and the graph model, (ii) generating embeddings from the graph model, training a machine-learning model on the embeddings, and obtaining a trained machine-learning model based on the training, (iii) generating embeddings from the graph model, inputting the embeddings into a trained machine-learning model based on the training, and obtaining a prediction for a task based on the data and the graph model, or (iv) any combination thereof; and outputting results based on the analyzing.

In some embodiments, the declarative modeling input is received as drag and drop actions of user interface elements within the graphical use interface, the user interface elements represent the at least two nodes and the at least one edge, and the user interface elements are registered in a model management and governance application with respective definition and execution points.

In some embodiments, the declarative modeling input further comprises a request to create a data pipeline or rule under each of the at least two nodes, and in response to the request to create, a unique identifier is generated by the data processing system for the data pipeline or the rule and the data pipeline or the rule are registered against each node and/or each edge against the graph model in a metadata catalogue of a model management and governance application based on the unique identifier, and wherein the data pipeline or the rule govern the node and/or the edge within the graph model and the analysis of the graph model.

In some embodiments, the outputting comprises displaying the results, communicating the results, storing the results, or any combination thereof.

In some embodiments, the results comprise: (i) a result of a query run against the data as part of the analyzing, (ii) the information for the task, (iii) the trained machine-learning model, (iv) the prediction from the trained machine-learning model, (v) or any combination thereof.

In some embodiments, generating the graph model further comprises performing entity resolution on the graph model, and wherein the entity resolution comprises identifying duplicate nodes and/or edges and consolidating the duplicate nodes and/or edges under a single node and/or edge.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
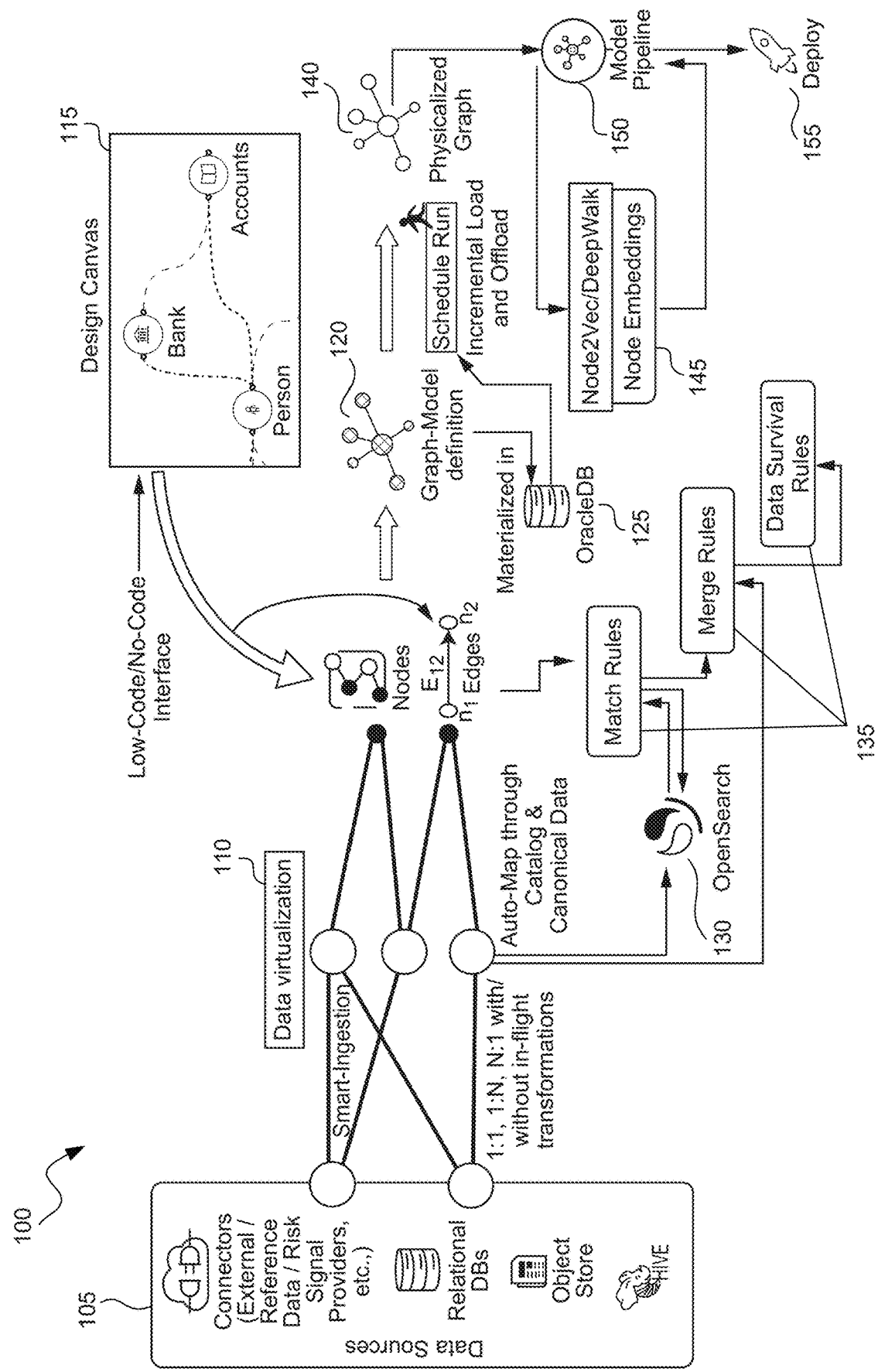
FIG. 1 is an illustration of a logical architecture for a graph modeling paradigm in accordance with various embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Overview of a Graph-Model (GraphDB) Design and Graph-Physicalization

Available graph technologies require graph models to be created offline including, but not limited to, nodes and links having to be defined using APIs or programmatic constructs in various encoding formats, many of which are proprietary. There is no conventional system that supports visual and declarative modeling of databases that use graph structures for semantic queries such as Graph-DB (graph model), physicalization of the graph model, and graph model loading rules including declaratively configuring sub-graphs, off-loading and delta (data) loading for an existing in-memory graph model. In order to address these challenges and others, a declarative graph-modeling process is described herein that supports artifacts including source data transformations and mapping to a graph model such as GraphDB, which are embedded into the same declarative paradigm, providing an integrated end-to-end graph modeling flow through a design-canvas (called 'Graph Pipeline") plus incremental load/offloading from the source-system feeding into the graph model. Although embodiments are described herein with respect to the particular domain of Financial-Crime-and-Compliance implemented via the Oracle Financial Services Global Business Unit, it should be understood that these same embodiments could be used in other domains and integrated with other offerings such as an SQL-Database (e.g., OracleDB) to provide an industry pioneering solution available to wide variety of users and customers.

Graph Modeling in general includes the following aspects:
1. Identifying sources that provide the nodes/vertices, edges, properties, aggregators, etc.;
2. Supporting heterogeneous data-sources as part of a single graph-pipeline and enabling using these sources purely thru configuration (and ZERO coding);
3. Applying inline data-quality rules definition/application, data-alterations with built-in control s/control s/approval s/traceability/workflow;
4. Handling multiple sources of data for graph analysis, transformations, loading, etc.;
5. Defining edges that connect the nodes thru drag/drop paradigm and with ability to define custom rules (e.g.: match-rules, attributes of relevance) on the fly;
6. Implementing definition of matching/grouping rules (e.g., for Entity-Resolution);
7. Identifying similarities to de-dupe, match and merge entities to generate unique nodes (includes global-unique-id generation, reconciling with party-mastering solution and output file generation for downstream use of resolved entities);
8. Defining a graph model database schema;
9. Loading from the graph model to a graph engine;
10. Managing incremental loading and offloading of data (for periods that are not relevant for analysis) and rules for the same including 'configuring' sub-graph generation rules (NO-code);
11. Setting up batch schedules for the above with automatic generation of task-list and solve-order; and
12. Handling serialization/de-serialization when the graph engine is shutdown or restarted or to handle changes in configuration.

All of the above are purpose built today by conventional solutions in the market, managed thru proprietary mechanisms, coding and by use of black-box utilities. There is no low-code/no-code design paradigm in this landscape. The graph modeling paradigm solution described herein and implemented through a Graph-Pipeline-Canvas achieves all of the above with auditability, traceability and explainability. Moreover, the graph modeling paradigm is generic, domain agnostic and data-source agnostic.

The logical architecture for the graph modeling paradigm is illustrated in FIG. 1. As shown, the architecture 100 supports data from multiple sources 105 in a variety of formats. A data manager subsystem or service 110 performs data virtualization to retrieve and manipulate the data (smart-ingestion process) without requiring technical details about the data, such as how the data is formatted or where it is physically located. The data manipulation performed by the data manager subsystem or service 110 includes applying in-flight data transformations and auto mapping through cataloged and canonical data. Once the data has been ingested and prepared for consumption by the data manager subsystem or service 110, the design-canvas 115 (called 'Graph Pipeline") is used to design a data model 120 from the data. The design-canvas 115 is a low code/no-code graphical user interface that facilitates users to describe an arbitrary domain as a connected graph of nodes and relationships with properties and labels. For example, a graph data model may be designed to facilitate the detection of patterns in the form of financial crime queries and solve business and technical problems by organizing a data structure for the graph database 125 such as OracleDB. The design of data model 120 is facilitated using an analytics tool 130 such as OpenSearch integrated with the data manger 110 to ingest, search, visualize, and analyze the data using various rules 135.

Once the data model 120 is designed, the data model 120 is visualized and/or physicalized as a physicalized graph using a physicalization tool 140. The data model 120 is input into the physicalization tool 140 via an incremental load and offload process that ultimately results in generation of the physicalized graph. The visualization and/or physicalization process performed by the physicalization tool 140 comprises transforming data values and relationships between data as configured in the data model 120 into visual and/or physical properties. For example, data can be used to shape the geometry of a physical object, much like how lengths, angles, and slopes are used to encode data in visualizations. The physicalized graph is then availed to an embedding model 145 (e.g., node2vec) in order to generate a lower dimensional representation of the physicalized graph. For example, given any physicalized graph, the embedding model 145 can learn continuous feature representations for the nodes and generate node embeddings, which can then be used for various downstream machine-learning tasks. The node embeddings can then be used as input for a machine-learning model pipeline 150 to train and deploy machine-learning models 155. Continuing with the example described above, machine-learning models can be trained to learn patterns in the form of financial crime within data modeled by the physicalized graph, and then the trained machine-learning models can be deployed to assist users with running financial crime queries on new datasets in an inference phase.

In an exemplary embodiment, a computer implemented method is provided that comprises: generating, by a data processing system, a graphical user interface for implementing a declarative modeling application, where the graphical user interface comprises one or more tools configured to allow a user to build and visualize a graph model using declarative modeling; obtaining, by the data processing system, data for the graph model from one or more sources based on input from the user received via the graphical user interface; receiving, by the data processing system, declarative modeling input from the user via the graphical user interface, where the input comprises a request to create at least two nodes representing logical entities within the data and at least one edge representing one or more relationships between the logical entities, where the request specifies types of nodes and edges for the at least two nodes and the at least one edge, attributes or properties for the at least two nodes and the at least one edge, and constraints on the relationships between the logical entities, and where the request specifies constraints on a layout of the graph model including an arrangement of the at least two nodes and the at least one edge in a visual representation; generating, by the data processing system, the graph model based on declarative modeling input from the user and the data for the graph model, where the generating comprises: extracting information from the declarative modeling input to define a graph structure, the extracting includes identifying the types, the attributes or properties, and the constraints for the at least two nodes and the at least one edge specified by the user; connecting the at least two nodes and the at least one edge to the one or more sources via one or more data pipelines based on the data used for the attributes or properties and relationships of the at least two nodes and the at least one edge specified by the user; and creating the at least two nodes and the at least one edge of the graph model, where each node is instantiated with the attributes or properties, and the at least one edge is established based on the relationship between the at least two nodes; and rendering the graph model in the graphical user interface.

Advantageously, the graph modeling paradigm provides an open-systems architecture, granular functionality that can be mixed-matched with custom third-party equivalents, support for real-time and event-driven refreshes, jurisdiction or other filter based logical sub-graphs (end-user view would restrict them to a subset of nodes/edges as a logical graph derived from the global-graph), and General Data Protection Regulation (GDPR) compliance, language translations, transliteration (in the process of Entity-Resolution), and the like.

Solution Design and Process Flow of the Graph Pipeline

In the financial domain space, there are millions of transactions per day and it is hard to find anomalies in all that data (e.g., fraudulent transactions). Most applications in this domain are rule based—for example, look at transaction greater than x ($10,000), the transaction is between two individuals (not entities), and those two individuals have not had a similar transaction in the past two years, and only if the rule is satisfied will the transaction be flagged for manual review of fraudulence. Most of these rule based systems yield thousands of false positives that waste time and processing resources. The design canvas (graph pipeline) is part of the logical architecture described herein for graph modeling and facilitates the design of graph data models to address these challenges and others. The graph pipeline represents the potential transaction patterns as graph nodes to generate a visual paradigm that allows for easier and more accurate analysis of the transactions (e.g., to identify fraudulent transactions).

In general the graph pipeline, allows a user to pick up global entities such as transaction parties and actions, drop them on the canvas (a visual aspect to exploring and analyzing the data), and set-up rules (customizable aspect to exploring and analyzing the data) to visualize the global entities based on defined actions and conditions of interest (e.g., connect the entity nodes using the transaction therebetween and only do this for transactions originating from Istanbul, Turkey in the past eight months). The graph pipeline can work with hybrid data-sources (Relational, Files, Object-Store, HDFS, Parquet, etc.) to source data for nodes or vertices and edges. The input data is typically raw data (source-data via common-staging-area) and any incremental data from specific domain tables (e.g.: reference data or other external data pre-ingested into domain data-model). The rules essentially define the weights for edges connecting the nodes and informing the user as to the global entities the user may be interested in reviewing at a greater/finer level of detail (e.g., the weights may be used to generate and lighten or darken lines representing edges that are rendered between nodes—darker lines being the result of larger weights and visually indicating something of potential greater interest to the user). Once the graph model is generated, it can then be explored using graph queries (e.g., SQL-like queries run on the graph model), graph analytics tools (e.g., tools that let a user view a network of relationships or hidden-relationships by adding or removing layers to the graph model), and machine learning model (e.g., models trained to identify patterns of nodes and edges within the graph model that are typically associated with fraudulent activity).

Figure 2:
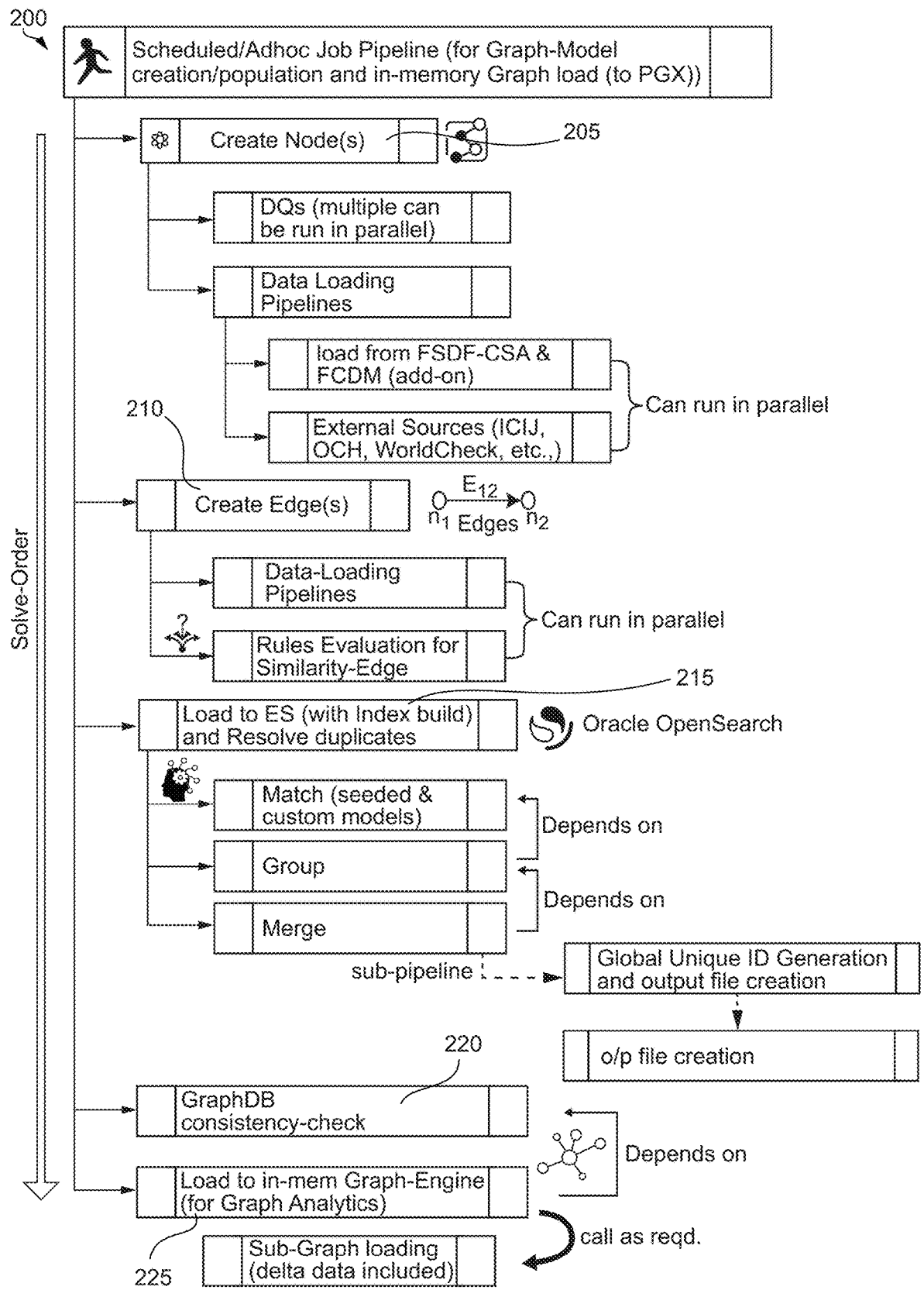
FIG. 2 depicts a flowchart illustrating a process implemented by a Graph Pipeline to build a graph model in accordance with various embodiments.
Figure 3:
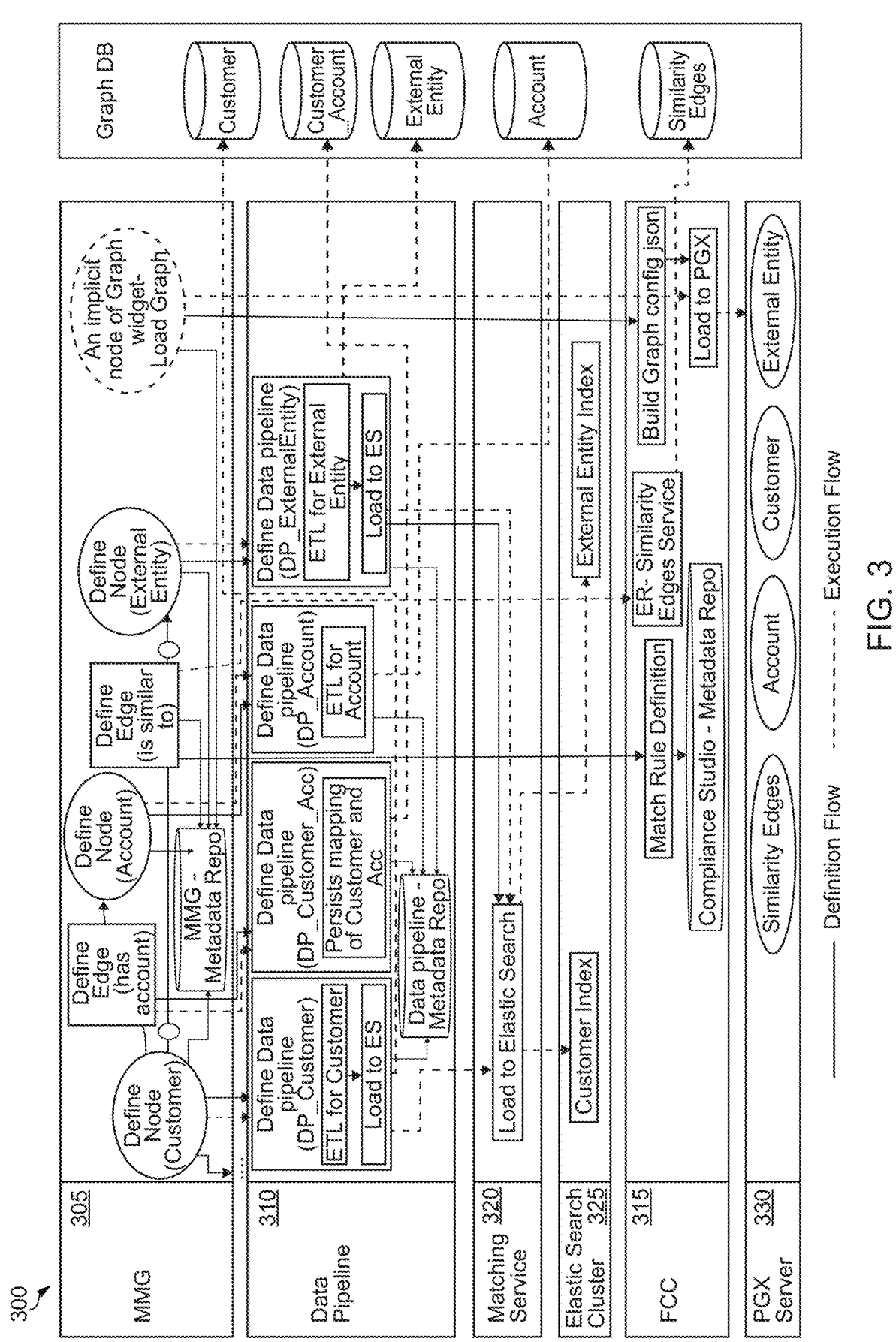
FIG. 3 depicts a swim lane diagram illustrating interactions between various components of the Graph Pipeline to build a graph model in accordance with various embodiments.
Figure 4:
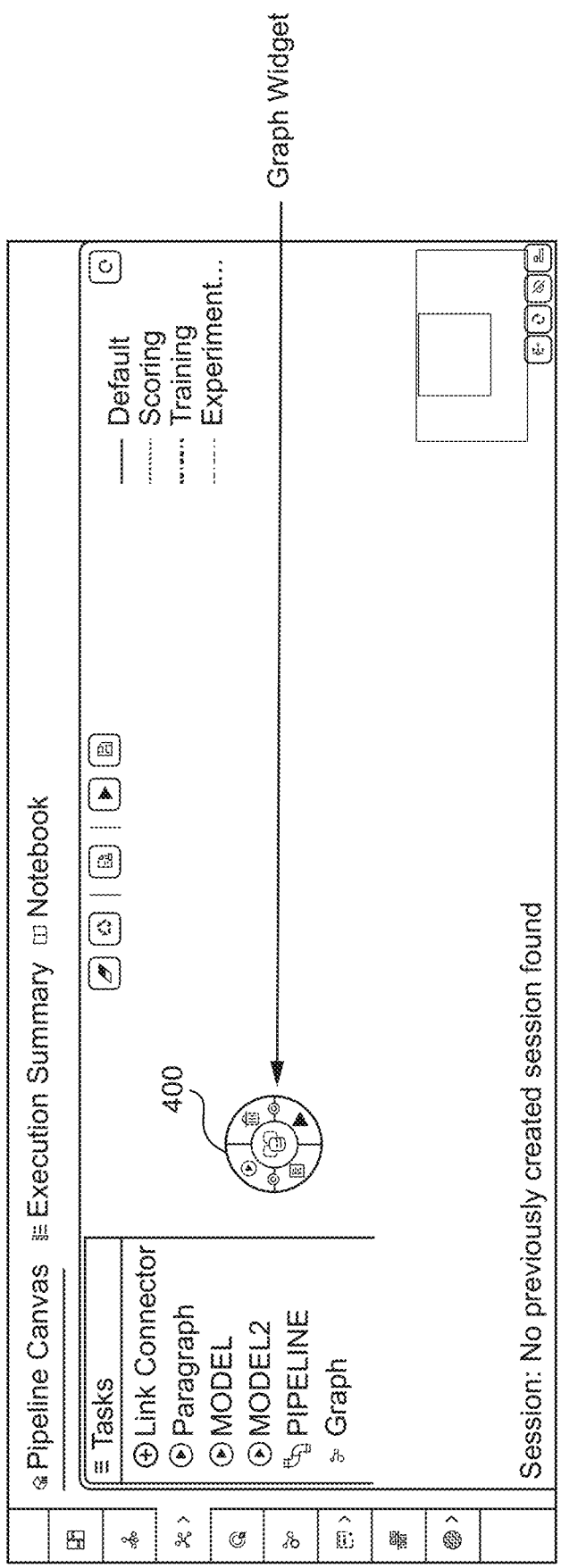
FIG. 4 illustrates a user executing the Graph Pipeline from within a canvas using a graph widget in accordance with various embodiments.

FIG. 2 shows an exemplary flow 200 of the graph pipeline. FIG. 3 shows the process flow 200 as a swim lane diagram 300 illustrating interactions between various components of the graph pipeline. The process of generating a graph model such as a graph database (e.g., GraphDB) can be started by executing the graph pipeline from within the canvas using a graph widget 400 (e.g., a user interface object), as shown in FIG. 4. Once within the canvas, a user can identify the data sources and gather the data to be ingested into the graph pipeline for generating a graph model. The identification and gathering of data may be facilitated through one or more Extract, Transform, and Load (ETL) tools that essentially extract the data from its original source, transform the data by deduplicating it, combining it, and ensuring quality, to then loading the data into a target database or central repository. The identification and gathering of the data may further include analyzing the data to understand its structure and relationships. For example, a user, subsystem, or service may start by exploring the data to get a sense of its content and format. This can include examining sample records, reviewing data documentation, or querying the dataset to ultimately identify a subset of the data to be used for generating the graph model. This can also include preprocessing of the subset of the data to be used for generating the graph model. In preprocessing, the data may be cleaned to remove any inconsistencies or errors. The data may also be standardized to a predetermined format to ensure consistency across different sources.

Once the data has been examined and the subset of data to be used for the modeling has been identified and centralized, the user, subsystem, or service can use the canvas to identify the entities in the data that need to be resolved. Entities can be people, organizations, products, or any other relevant entities that have distinct characteristics and relationships. The attributes or properties associated with each entity can also be identified. These attributes capture the information that describes the entities and their characteristics. For example, for a person entity, attributes can include name, age, gender, and occupation. In some instances, a unique identifier (ID) is assigned to each entity.

A graph schema is then defined by the user, subsystem, or service using the canvas based on the on the entities and their relationships. In some instances, the graph schema is defined by Graph-DB which is an optimized store (schema) within Oracle-DB to represent (physically) the graph-model. The source data for Graph-DB can be anywhere (e.g., server side, client side, third-party big-data, object-store, file system, and the like) This allows for rapid generation of in-memory graph, loading, incremental-loading and offloading of data in the graph schema. The graph schema refers to the structure and organization of the graph, including the types of nodes, the relationships between nodes, and the properties or attributes associated with nodes and edges. It defines the blueprint or template for representing and organizing data in a graph. The various components that may defined for the graph schema include without limitation:

1. Node Types: Define the different types or categories of nodes in the graph. Each node type represents a distinct entity or concept. For example, in a social network graph, node types can include "Person," "Organization," or "Interest."
2. Edge Types: Specify the different types of relationships or connections between nodes. Each edge type represents a specific relationship or association. For example, in a social network graph, edge types can include "Friendship," "WorkedAt," or "Likes."
3. Node Properties: Identify the attributes or properties associated with each node type. Node properties capture specific information about the entities represented by the nodes. For example, for a "Person" node type, properties can include "Name," "Age," or "Location."
4. Edge Properties: Determine the attributes or properties associated with each edge type. Edge properties provide additional information about the relationships between nodes. For example, for a "Friendship" edge type, properties can include "DateConnected" or "StrengthOfConnection."
5. Cardinality: Define the cardinality of the relationships between nodes. Cardinality specifies the number of nodes involved in a relationship. It can indicate whether a relationship is one-to-one, one-to-many, or many-to-many.
6. Constraints: Specify any constraints or rules that govern the graph model. Constraints can include uniqueness constraints, data validation rules, or relationship constraints that define the integrity and validity of the data in the graph.
7. Hierarchies or Taxonomies: If applicable, define any hierarchies or taxonomies within the graph schema. This helps organize the nodes into structured classifications or categories.

The graph schema serves as a guide for designing and organizing the graph data, ensuring consistency and facilitating efficient querying and analysis. It provides a high-level overview of the entities, relationships, and properties within the graph model, enabling better understanding, interpretation, and utilization of the data.

As shown in FIGS. 2 and 3 at block 205, the user, subsystem, or service then uses the canvas to define nodes (e.g., customer, account, external entity, etc.) for the graph model. The nodes can be defined using a drag and drop gesture or user interface operation and widgets representing the nodes are registered as building-block components in the Model Management and Governance (MMG) application 305 with the respective definition and execution points (as REST end points). For example, a user may select a entity from the subset data that they wish to define as a node, drag the entity over to a design window of the canvas, and drop the entity into the design window. This process may be repeated to create nodes in the graph model for each identified entity. In some instances, a unique identifier (ID) is assigned to each entity (the ID may be associated with the MMG application 305). Defining a node may further include the user adding relevant attributes or properties to each node to capture additional information about the entity. In some instances, SQL Server Data Quality Services (DQS) are used while defining the nodes to ensure correction, enrichment, standardization, and de-duplication of the data, nodes, and properties thereof. For each node defined, a data connection is instantiated in the data pipeline 310 between the widget registered in the MMG application 305 and the source of the data in the database or central repository. The MMG application 305 is a services modeling platform comprising embedded sandbox management, feature-engineering, data-pipeline, low-code/no-code modeling canvas that automatically generates 'notebook with Python' code, executes the graph-pipeline tool, performs model-risk-management, and has the ability to register third party models with model-serving APIs. The data pipeline 310 is a service or subsystem for embedded data sourcing, management, and transformations supporting multiple data-sources within MMG application 305 and provides the data plumbing for every granular modeling function including graph database and in-memory graph generation. A data pipeline 310 or matching rule 315 created under a node responds with a unique identifier to MMG application 305 and is registered against the node for the graph model in a MMG metadata catalogue. It is possible to have multiple data pipelines 310 tagged to one node; each data pipeline to source data from different sources.

As also shown in FIGS. 2 and 3 at block 210, the user, subsystem, or service then uses the canvas to define edges (e.g., belongs to or similar to relationships) for the graph model. The edges can be defined by identifying the relationships between entities, creating the edges between nodes to represent these relationships, and defining the type of edge based on the nature of the relationship. The edges can be defined using a drag and drop gesture or user interface operation and widgets representing the edges are registered as building-block components in the MMG application 305 with the respective definition and execution points (as REST end points). For example, a user may select two nodes they wish connect with an edge to represent a relationship, drag an edge type over to a design window of the canvas, and drop/stretch the edge into the design window connecting the two nodes. This process may be repeated to create various edges between nodes in the graph model. In some instance, DQS and/or rules are used while creating the edges to ensure correction for similarity to other edges and de-duplication of the data and edges. For each node created, a data connection is instantiated in the data pipeline 310 between the edge and connected nodes registered in the MMG application 305 and the source of the data in the database or central repository in order to maintain a mapping between the various pieces of data (e.g., entities). A data pipeline 310 or matching rule 315 created under an edge responds with a unique identifier to MMG application 305 and is registered against the edge for the graph model in a MMG metadata catalogue. It is possible to have multiple data pipelines 310 tagged to one edges; each data pipeline to map data between the different sources.

Figure 5:
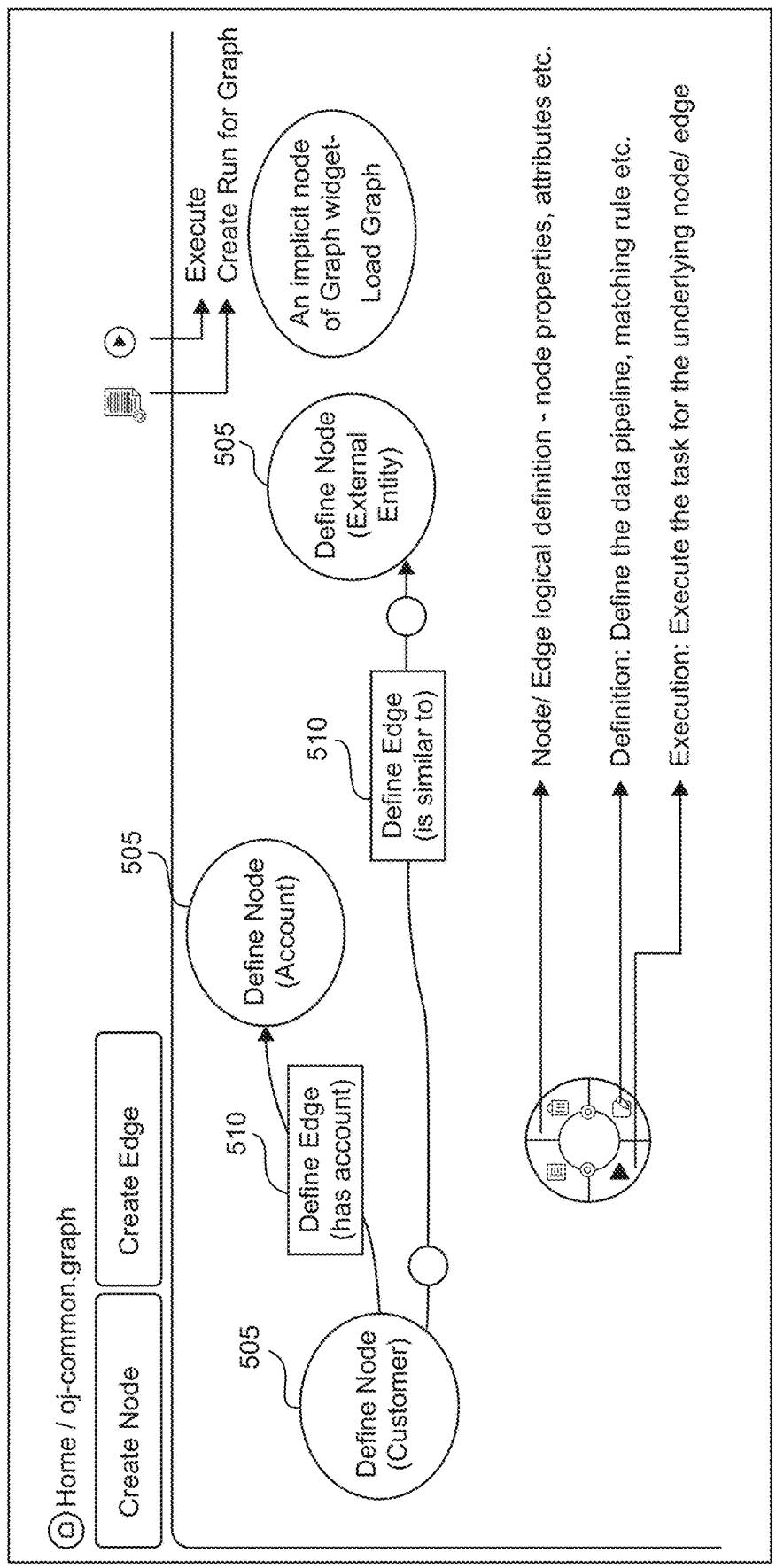
FIG. 5 illustrates a user defining the basic building blocks (nodes and edges) of the graph model using the canvas in accordance with various embodiments.

FIG. 5 illustrates a user defining the basic building-blocks (nodes and edges) of the graph model using the canvas. Nodes 505 represent a logical entity, e.g., customer, account etc. Edges 510 connect two nodes with a relationship. The relationship is derived by an action, e.g., "has an account" connects Account and Customer nodes to derive the relationship "Customer C1 has an Account A1" or "a transaction occurred" connects Customers or Entity nodes to derive the relationship "Customer E1 performed a transactions with Customer F1". As shown, various nodes 505 can be defined for entities and edges 510 used to connect nodes 505 having one or more relationships. In doing so, various aspects like node-properties, data-aggregations, attributes, etc., are captured. Edges 510 that define relationships between nodes 505, specific rules that determine hidden relationships, and similarities can be assessed across multiple sources, etc.

Figure 6:
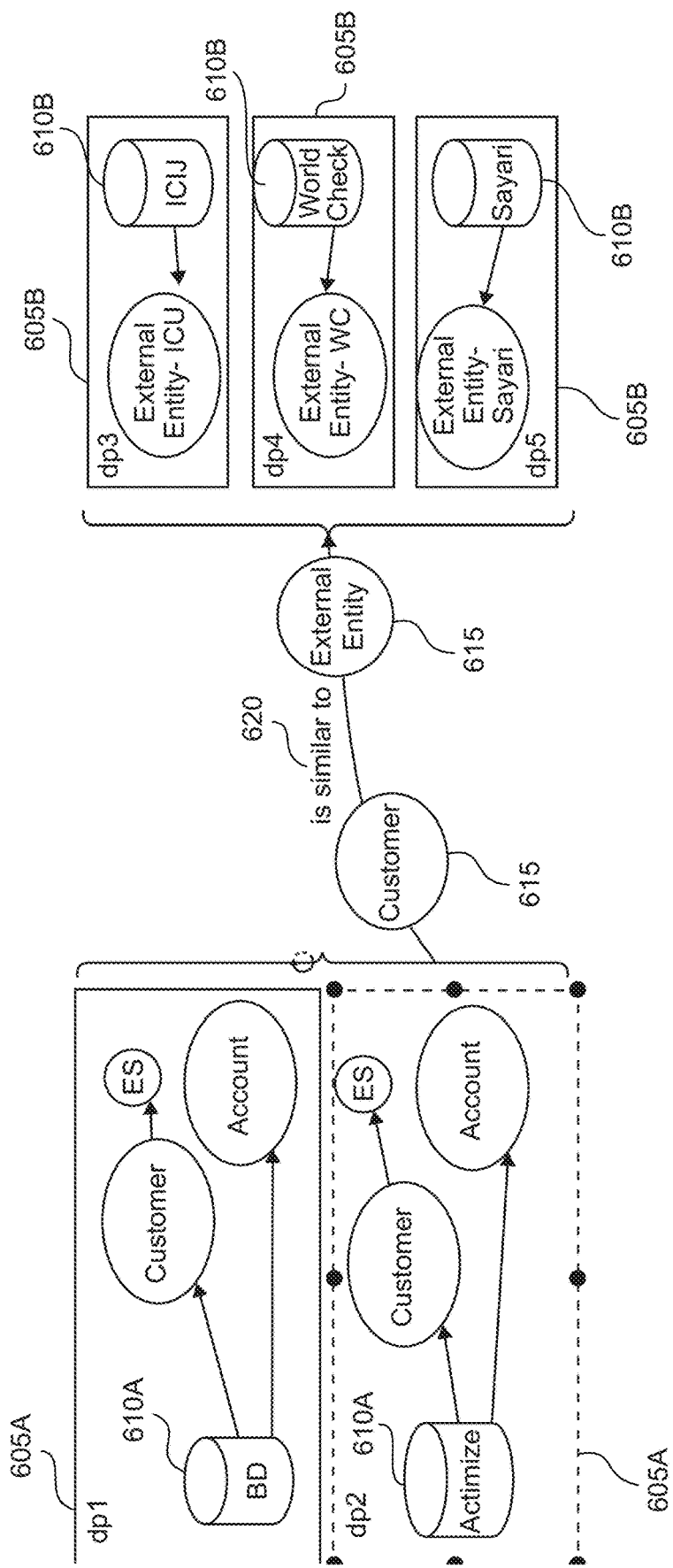
FIG. 6 illustrates multiple data pipelines tagged to one node and each data pipeline comprising source data from different sources in accordance with various embodiments.

As shown in FIG. 6, it is possible to have multiple data pipelines 605A; 605B tagged to one node; each data pipeline 605A; 605B to source data from different sources 610A; 610B. Nodes 615 and edges 620 can have multiple data providers (sources) and a schedule of data ingestion could be different among the providers. The data-pipelines support definition of ingestion rules, criteria, including handling complex 'scenarios' that evaluate local vs. global typologies. Widgets representing building-block components are registered in the MMG application with the respective definition and execution points (as REST end points). A data pipeline or matching rule created under a node responds with a unique identifier to MMG and is registered against the node/edge for the graph model in MMG metadata catalogue. Accordingly, the embedded data-pipelines source data into the graph pipeline, and models them appropriately based on the definitions or configurations performed thru the canvas (i.e., graphical user interface).

With reference back to FIGS. 2 and 3, data-ingestion is followed at block 215 where indexes are built into an analytics tool such as OpenSearch (Oracle's Elastic Search (ES)) for running matching, grouping, and merging of entities to generate global unique entity identifiers. The OpenSearch can be implemented, at least partially, using an elastic search cluster 325. The elastic search cluster 325 is used to generate the indexes for a rapid match/merge algorithm (part of the analytics tool). The matching and grouping processes support ingestion of custom models apart from seeded model(s). The output of the above step results in an output file for the graph model that has resolved entities (de-duping and reconciling similarity of nodes/edges within and across data-sources) and can be used for downstream applications or use-cases to consume. The matching, grouping, and merging of entities is performed using the matching service 320 that provides a declarative rule paradigm to determine/match duplicate entities and score them for determining which ones can be merged into a common/unique global entity.

Finding similarity within edges among two nodes is achieved by an entity-resolution component or matching job subsystem. The matching-job subsystem is configured as a set of rules defined declaratively using a matching-rule building block widget in MMG application 305. Node(s) grouping is based on the matched rules. Nodes from the group with low match scores may be eliminated from the group and the remaining nodes consolidated to a unique node. The entity-resolution component is a plug-and-play idea within the graph pipeline. The entity-resolution component can be run as an independent service with or without graph association. Alternatively, the ability to plug-in the entity-resolution component functionality can be supported from a third-party system (a REST interface).

Entity-resolution is key to many domains in order to deliver analytics that focuses on every unique entity under consideration. Entity-resolution is the process of identifying entities (individuals, corporates, non-profit orgs, partnerships, groups, etc.,), finding duplicates, matches, masked-identities, multiple-variants (created on purpose or otherwise), and the like through various matching methodologies (models included), grouping, scoring groups for merging, merging and generating global unique IDs for entities. This is an important part of downstream services especially in financial crime detection, risk modeling, profitability analysis, etc. The entity-resolution process is both a granular service and embedded within graph pipeline to help generate global-graph for various analysis (the use-case described herein is Global Financial-Crime Graph derived from a Financial-Crime-and-Compliance Data-Model).

Figure 7:
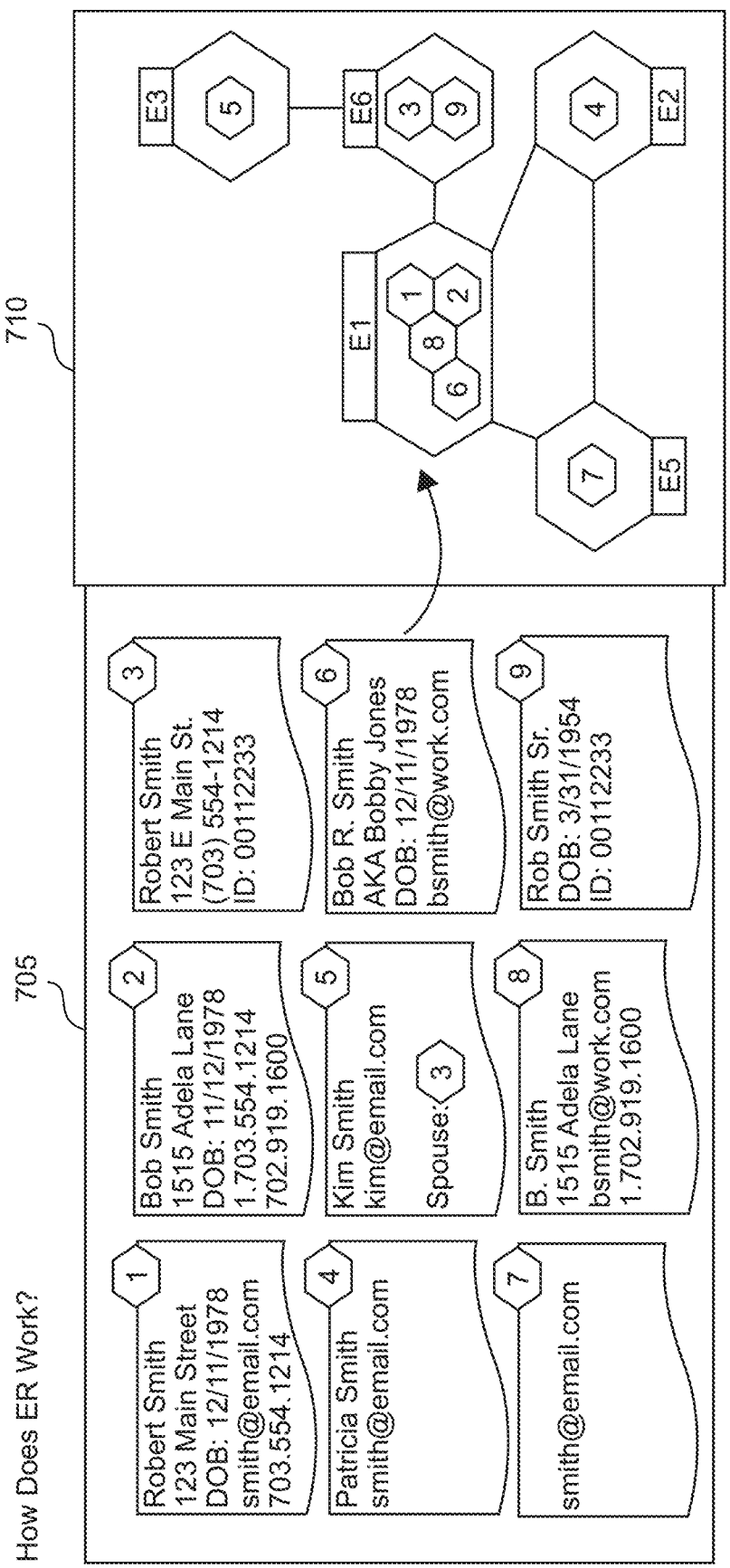
FIG. 7 illustrates entity resolution in accordance with various embodiments.

As illustrated in FIG. 7, entity-resolution starts with loading entities 705 along with key attributes that help identify the entity (e.g., customer-id, customer-name, customer-address, email, phone, etc.,). Then any relationship between these entities is loaded (as foreign-key attributes for example). Loading of the above is to the analytics tool such as OpenSearch for indexing and for running matching/grouping at scale. The matching rules are defined using a low-code/no-code interface and the application system provides a host of seeded rules to use from. Advanced-matching logic driven by models (seeded as well as custom) are supported. OpenSearch was found to specifically address NxN iterative matching following by NxM grouping efficiently compared to Enterprise Data Quality (EDQ) or other technologies. The result of matching-grouping is a set of groups 710 that can then be scored for merging to generate global unique entities (with unique-ids)—resolving matches to unique-entities (nodes). The scoring logic can also be declarative or model based. The output of this is a file that can be fed into downstream systems that work on resolved global unique party-IDs.

With reference back to FIGS. 2 and 3, following design and entity resolution by the graph pipeline, the graph model (e.g., encoded in GraphDB) can be processed at block 220 for additional validation, consistency checks and optimizations (all configurable). For example, inline differential qualitative analysis may be performed to compare and analyze the differences between two or more graphs. Inline differential qualitative analysis allows a user, service, or subsystem to identify changes, updates, or variations in the graph structure and data over time or across different versions. Inline differential qualitative analysis includes selecting the two or more graph versions that are to be compared. These versions can represent different time points, data sources, or any other relevant variations. Specific aspects of the graph that are to be analyzed and compared are then determined. This can include node attributes, edge properties, graph topology, or any other relevant characteristics. The appropriate methods or techniques to perform the differential analysis are then selected based on the defined scope. The methods or techniques may include without limitation the following:

1. Node and Edge Comparison: Compare the attributes or properties of nodes and edges between the different graph versions. Identify changes in values, additions, deletions, or modifications.
2. Graph Topology Analysis: Analyze the structure of the graphs and compare the connections between nodes. Identify changes in the graph topology, such as the addition or removal of edges or nodes.
3. Statistical Analysis: Apply statistical techniques to quantify and analyze the differences between the graph versions. This can involve measuring similarity, calculating distance metrics, or performing hypothesis testing.
4. Visual Comparison: Utilize graph visualization techniques to visually compare the graphs. Visualize the differences in the graph structure, node positions, or edge connections.

Thereafter, the selected analysis methods or techniques are applied to the graph versions and the relevant information is extracted. This may involve writing scripts or using specialized tools or libraries for graph analysis. The results of the differential qualitative analysis may then be analyzed, and the findings interpreted. The changes, trends, or patterns observed between the graph versions may be identified and documented. This can involve creating reports, visualizations, or summaries to communicate the findings effectively to other users, service, or subsystems. The differential qualitative analysis process may be repeated as needed, considering different aspects of the graph or comparing additional versions to gain further insights. The differential qualitative analysis helps in understanding how the graph evolves, identifying anomalies or inconsistencies, and gaining insights into the changes that occur over time or across different versions of the graph.

At block 225, a dedicated graph model can be encoded to persist the target nodes, edges, properties, aggregators, macros, and the like, and may be created as part of the graph definition. The graph model contains the transformed and/or aggregated entities. There are pre-built seeded jobs to load and materialize the graph model (in in-memory graph analytic engine (PGX) 330 from the schema such as that in GraphDB)) as well as to serialize or de-serialize the graph model (to disk/object-store). Load-to-Graph is an implicit node or pre-seeded job-type for any graph. It does the loading of data into memory store of PGX 330. This helps in rapid launching of the graph model. It also helps to handle incremental loads and offload of data on subsequent days (delta data) more efficiently. In addition, the low-code/no-code graph pipeline supports configuring a number of graph-analytics queries, network of relationship/hidden-relationship analysis, etc., and in the process generates 'Notebook(s)' that can be further worked-on by users with appropriate entitlements. The 'Notebooks' can be used to provide the accelerators for a give file format such as GraphML.

Machine-Learning Pipeline Supporting Graph Models with Automatic Feature Engineering The physicalized graph (e.g., GraphDB) may be used: in a training phase for training one or more machine-learning models to learn patterns within data modeled by the physicalized graph, and/or in an inference phase as input for one or more trained machine-learning models to make an inference (e.g., a prediction for a financial crime) concerning data modeled within the physicalized graph. However, prediction tasks over nodes and edges in a physicalized graph require careful effort in engineering features used by learning algorithms. Feature engineering is a machine learning technique that leverages data to create new variables that aren't in the training set. It can produce new features for both supervised and unsupervised learning, with the goal of simplifying and speeding up data transformations while also enhancing model accuracy. Feature engineering is challenging because it requires a specific skillset including programming and understanding how to work with various systems and sources of data such as databases, requires domain expertise to pinpoint which features are relevant and valuable, and to visualize how the data points might interrelate in significant, predictive ways, it is time consuming and resource intensive, e.g., a manual feature engineering process requires the data scientist to look at all of the data on hand and come up with possible combinations of columns and predictors that could provide the insights required to solve the business problem, and can lead to error and biases, e.g., it is common to overstate some connections between phenomena in the data based on what is already believed to be true, while disregarding other connections that may turn out to be fruitful. There has been some progress conventionally in automating prediction by learning the features themselves. However, most feature learning approaches are not expressive enough to capture the diversity of connectivity patterns observed in networks.

Figure 8A:
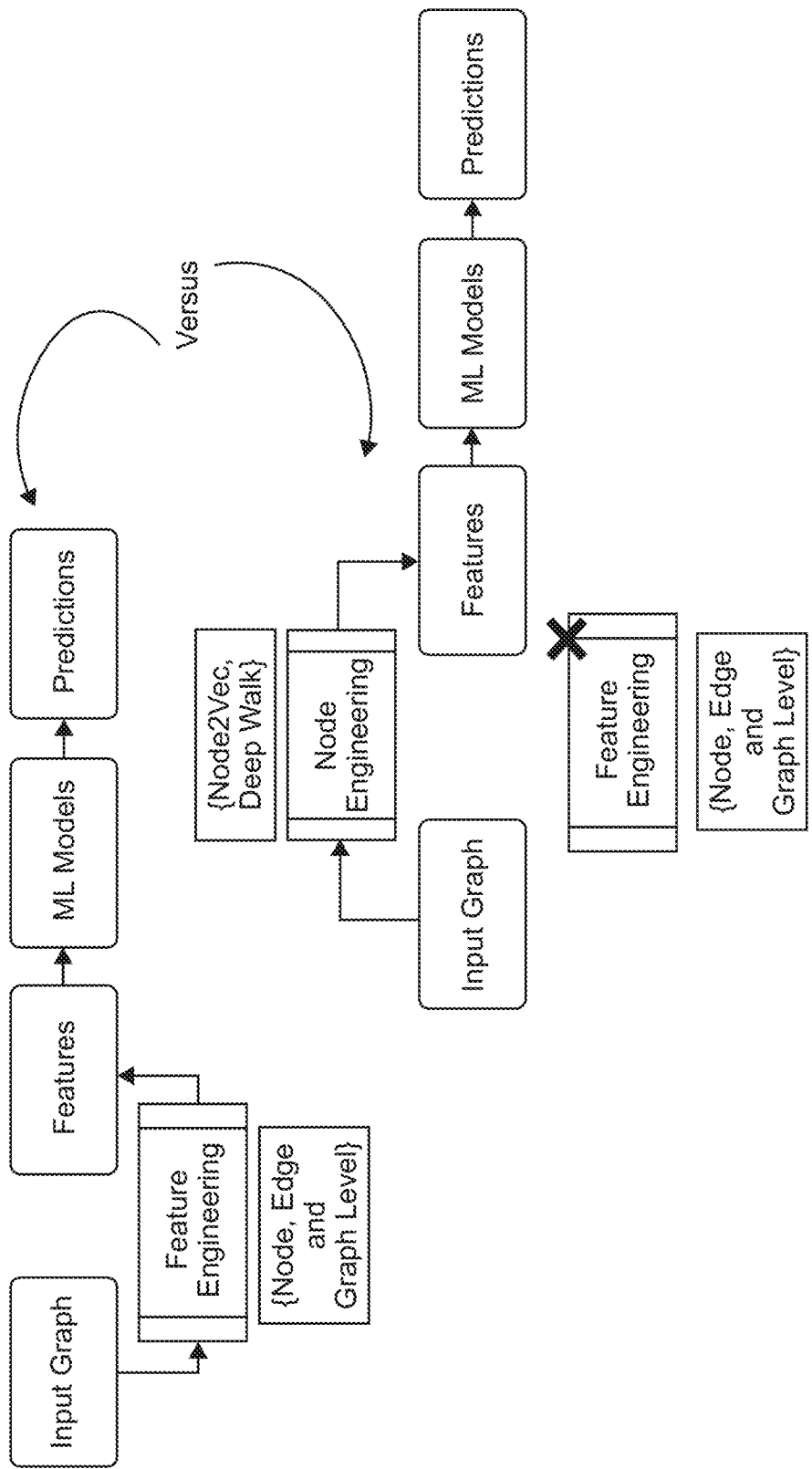
FIGS. 8A and 8B show block diagrams illustrating machine-learning pipelines for training and deploying machine-learning models in accordance with various embodiments.
Figure 8B:
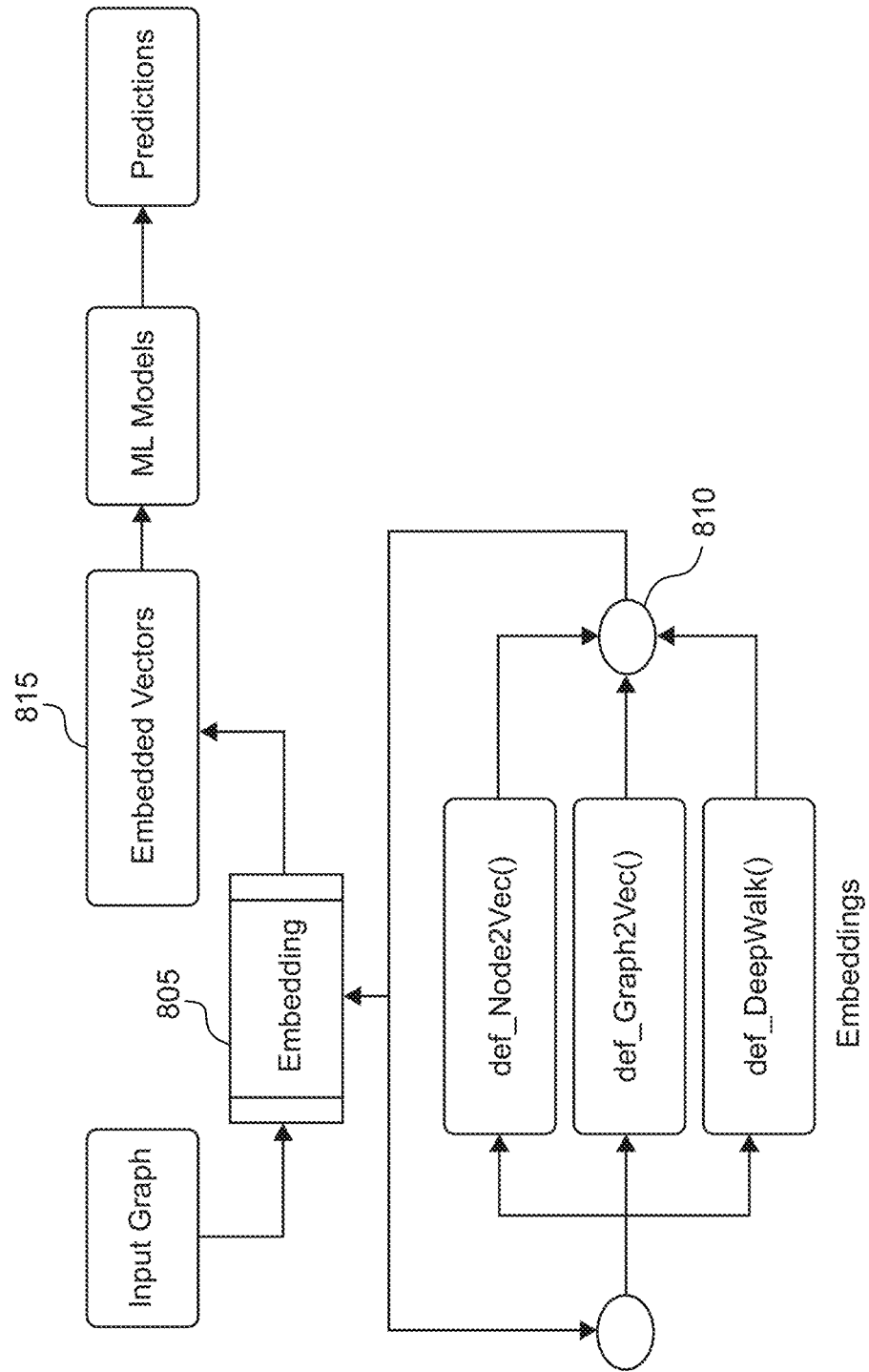

In order to address these challenges and others, the physicalized graph is availed to an embedding model (e.g., node2vec) to generate a lower dimensional representation of the physicalized graph without having to perform a separate feature engineering step (see, e.g., FIGS. 8A and 8B). The embedding model is an algorithm that allows the user to map nodes in a graph to an embedding space. Generally, the embedding space is of lower dimensions than the number of nodes in the original graph. The algorithm tries to preserve the initial structure within the original graph. Essentially, the nodes which are similar within the graph will yield similar embeddings in the embedding space. These embedding spaces are essentially a vector corresponding to each node in the network. For example, given any physicalized graph, the embedding model can learn continuous feature representations for the nodes and generate node embeddings. The node embeddings can then be used for various downstream machine-learning tasks such as input for a machine-learning model pipeline to train and deploy machine-learning models.

Figure 9:
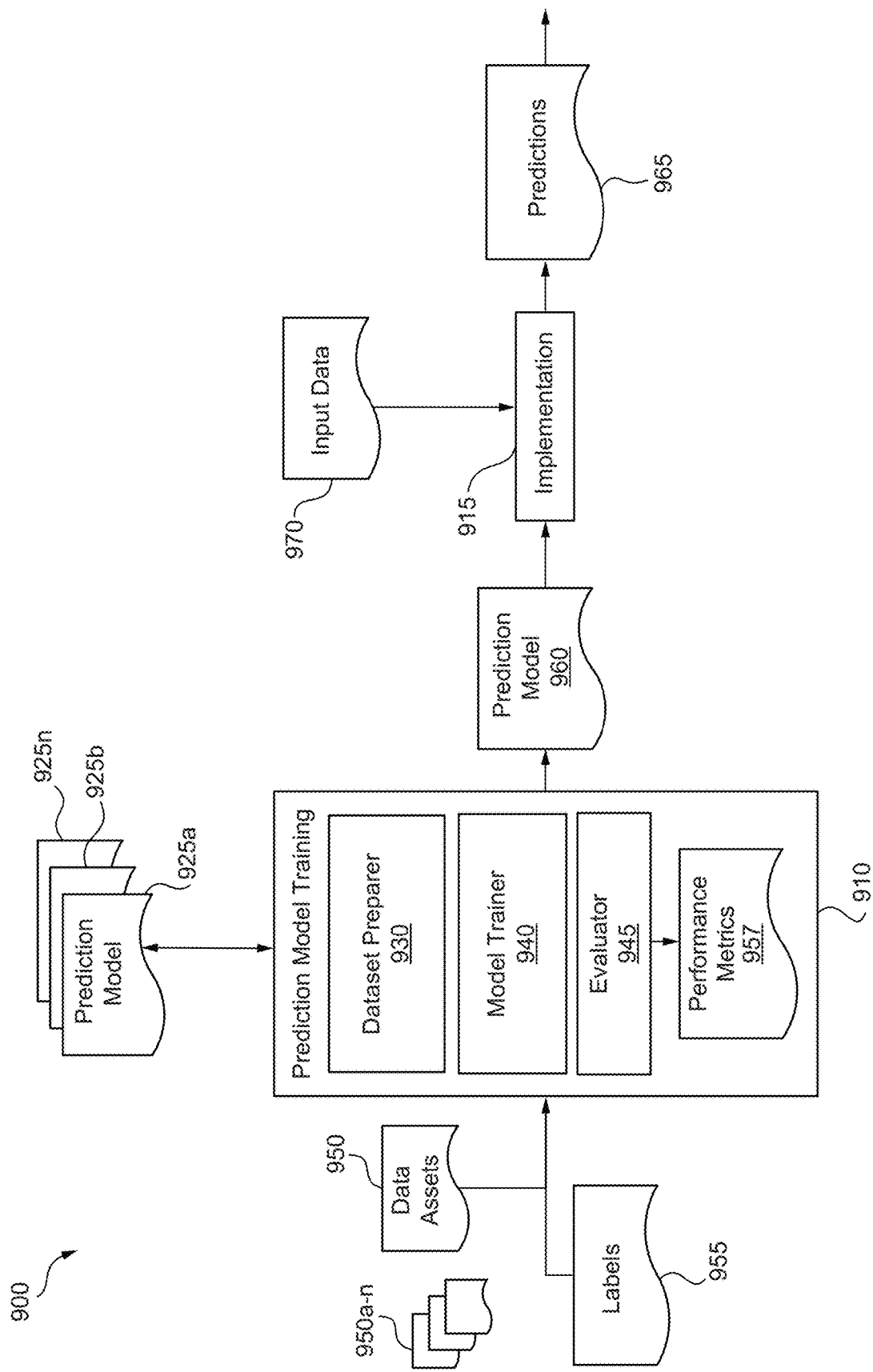
FIG. 9 show a block diagram illustrating a model system for training and deploying models in accordance with various embodiments.

FIG. 9 is a block diagram illustrating a model system 900 in accordance with various embodiments. The model system 900 in this example includes various stages: a training stage 910 to build and train models and an implementation stage 915 for implementing one or more models. The training stage 910 builds and trains one or more machine learning models 925*a*-925*n* ('n' represents any natural number) to be used by the other stages (which may be referred to herein individually as a prediction model 925 or collectively as the prediction models 925). For example, the prediction models 925 can include a model for predicting the occurrence of fraudulent activity or a financial crime (e.g., money laundering). Still other types of prediction models may be implemented in other examples according to this disclosure such as risk modeling and prediction, profitability analysis and forecasting, and the like.

A prediction model 925 can be a machine-learning model, such as a convolutional neural network ("CNN"), e.g., an inception neural network, a residual neural network ("Resnet"), or a recurrent neural network, e.g., long short-term memory ("LS™") models or gated recurrent units ("GRUs") models, other variants of Deep Neural Networks ("DNN") (e.g., a multi-label n-binary DNN classifier or multi-class DNN classifier). A prediction model 925 can also be any other suitable ML model trained for providing a prediction, such as a Generalized linear model (GLM), Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network). The model system 900 may employ the same type of model or different types of models for various tasks such as translating natural language to logical forms, named entity recognition, and/or classification.

To train the various prediction models 925, the training stage 910 is comprised of three main subsystems or services: dataset preparer 930, model trainer 940, and evaluator 945. The dataset preparer 930 performs the processes of loading data assets 950 (e.g., the physicalized graph and/or node embeddings), splitting the data assets 950 into training and validation sets 950 *a-n* so that the system can train and test the prediction models 925, and preprocessing of training and validation sets 950 *a-n*. The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. The training and validation sets 950 includes at least one physicalized graph and/or set of node embeddings. The physicalized graph can be obtained by the graph pipeline, as described in detail with respect to FIGS. 1-7. The node embeddings can be obtained by an embedding model (e.g., node2vec) that generates a lower dimensional representation of the physicalized graph without having to perform a separate feature engineering step. In some instances, the training and validation sets 950 includes the data within the physicalized graph and/or set of node embeddings and labels 955 corresponding to the data as a matrix or table of values. For example, for each physicalized graph, an indication of the correct activity (e.g., crime) to be inferred by the prediction model 925 may be provided as ground truth information for labels 955. The behavior of the prediction model 925 can then be adapted (e.g., through MinMax or ALS optimization or Gradient Descent) to minimize the difference between the generated inferences and the ground truth information.

As illustrated in FIG. 8B, the embedding model 805 is based on the idea of learning continuous representations (embeddings) for nodes by simulating random walks on the graph and then applying a variant of the word2vec algorithm. The input into the embedding model 805 is the physicalized graph with nodes and edges representing entities and relationships, respectively. The embedding model 805 starts by generating random walks on the graph. A random walk is a sequence of nodes obtained by traversing the graph, where the next node is chosen based on certain probability distributions. The embedding model 805 employs a biased random walk strategy, which balances between breadth-first and depth-first search. This strategy involves two parameters, "return" and "in-out," that control the tendency to explore local neighborhoods or reach out to distant nodes. Once a collection of random walks is obtained, the embedding model 805 uses them to learn node representations. The embedding model 805 applies a Skip-gram model, a variant of word2vec, to the generated random walks. The Skip-gram model's objective is to predict the context (surrounding nodes) given a target node. In the context of embedding model 805, each node in a random walk sequence is treated as the target node and aim to predict its neighboring nodes. The Skip-gram model is trained using stochastic gradient descent to optimize the objective function. The optimization process adjusts the node embeddings to maximize the likelihood of predicting neighboring nodes correctly. This step learns node representations that capture the structural information of the graph. After training the Skip-gram model, the embedding model 805 obtains high-dimensional embeddings 810 for each node. However, these embeddings are typically too large for practical use. To reduce the dimensionality, techniques like Principal Component Analysis (PCA) or t-distributed Stochastic Neighbor Embedding (t-SNE) can be applied. These methods preserve the pairwise relationships between nodes while projecting them into a lower-dimensional space. Once the node embeddings are obtained, they can be utilized for various downstream tasks. For example, they can be used as features for node classification, similarity measurement, or visualization of the graph. By using the embedding model 805, the model system 900 can effectively capture the structural properties of a graph and represent its nodes in a lower-dimensional space, facilitating analysis and interpretation of large-scale graph data.

In some instances, the node embeddings are preprocessed by the dataset preparer 930 to generate a vector (e.g., see vectors 815 in FIG. 8B) of the embeddings for the nodes. These vectors capture the underlying structural and semantic information of the nodes in a graph. Once the node embeddings are generated, each node is represented as a numerical vector. The dimensionality of these vectors is typically fixed and determined by the embedding method used. For example, if the embedding method produces embeddings of size 128, each node may be represented by a 128-dimensional vector. The resulting vectors possess various useful properties. For example, nodes that are similar or closely related in the graph tend to have similar vector representations. This similarity can be measured using various distance metrics such as cosine similarity or Euclidean distance. By leveraging the vector representations, the machine learning algorithms and models can learn and operate on the transformed graph structure instead of raw graph data.

The model trainer 940 performs the processes of determining hyperparameters for the model 925 and performing iterative operations of inputting examples from the training data 945*a* into the model 925 to find a set of model parameters (e.g., weights and/or biases) that minimizes a cost function(s) such as loss or error function for the model 925. The hyperparameters are settings that can be tuned or optimized to control the behavior of the model 925. Most models explicitly define hyperparameters that control different features of the models such as memory or cost of execution. However, additional hyperparameters may be defined to adapt the model 925 to a specific scenario. For example, learning rate, number of iterations, regularization weight or strength, and the like. The cost function can be constructed to measure the difference between the outputs inferred using the model 925 and the ground truth annotated to the samples using the labels. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, the cost or loss function may be defined that measures the difference between the ground truth value for an input and the predicted value for that input. As part of training, techniques such as back propagation, random feedback, Direct Feedback Alignment (DFA), Indirect Feedback Alignment (IFA), Hebbian learning, and the like are used to minimize this cost or loss function.

Once the set of model parameters are identified, the model 925 has been trained and the evaluator 945 performs the additional processes of testing or validation using the subset of testing data 950*b* (testing or validation data set). The testing or validation processes includes iterative operations of inputting utterances from the subset of testing data 950*b* into the model 925 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set from the subset of test data 950*a* may be input into the model 925 to obtain output (in this example context, a fraud prediction), and the output is evaluated versus ground truth entities using correlation techniques such as Bland-Altman method and the Spearman's rank correlation coefficients. Further, performance metrics 957 may be calculated in evaluation stage 915 such as the error, accuracy, precision, recall, receiver operating characteristic curve (ROC), etc. The metrics 957 may be used in the evaluator 945 to analyze performance of the model 925 for providing recommendations on training and hyperparameter optimization.

As should be understood, other training/validation mechanisms are contemplated and may be implemented within the model system 900. For example, the model 925 may be trained and model parameters may be tuned on data assets from a subset of obtained or filtered datasets and the datasets from a subset of obtained or filtered datasets may only be used for testing and evaluating performance of the model 925. Moreover, although the training mechanisms described herein focus on training a new model 925, these training mechanisms can also be utilized to fine tune existing models trained from other datasets. For example, in some instances, a model 925 might have been pre-trained using data assets from one or more different modalities or tasks. In those cases, the models 925 can be used for transfer learning and retrained/validated using the training and validating data as described above.

The model training stage 910 outputs trained models including one or more trained prediction models 960. The one or more trained prediction models 960 may be deployed and used in the implementation stage 915 for providing predictions 965 to users. For example, prediction models 960 may receive input data 970 including a physicalized graph and/or set of node embeddings and provide predictions 965 to a user based on features determined from data modeled within the physicalized graph and/or set of node embeddings.

Figure 10:
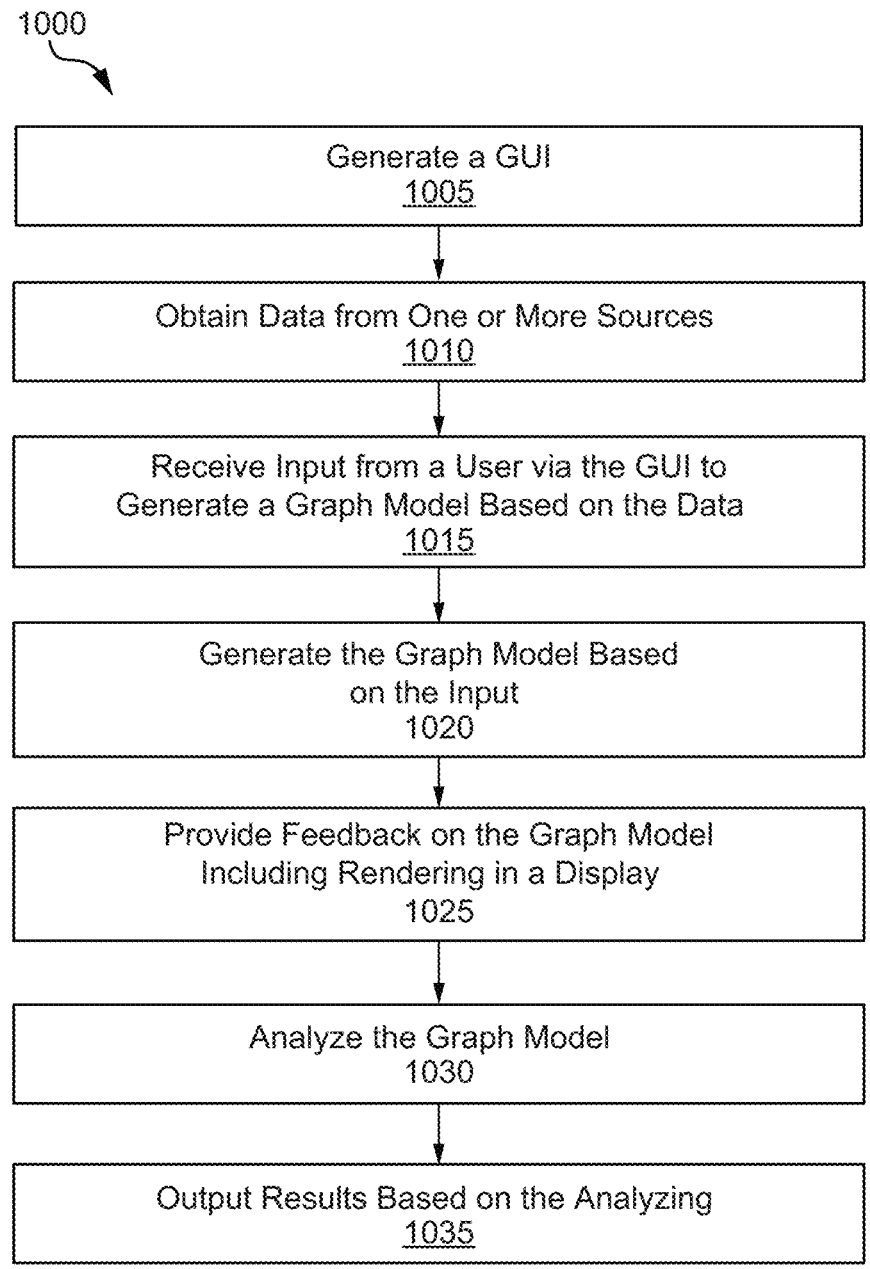
FIG. 10 depicts a flowchart illustrating a declarative graph modeling process in accordance with various embodiments.

While not explicitly shown, it will be appreciated that the model system 900 may further include a developer device associated with a developer. Communications from a developer device to components of the model system 900 may indicate what types of input data, utterances, and/or database schema are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured Techniques for Building Graph Models Using a Graph Pipeline FIG. 10 depicts a simplified flowchart 1000 depicting a declarative graph modeling process implemented by architecture 100 (e.g., a model pipeline, design canvas, model system, or any combination thereof generally referred to herein as a data processing system) of FIG. 1 according to certain embodiments. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain alternative embodiments, the steps may be performed in some different order or some steps may also be performed in parallel.

The process commences in step 1005, where a graphical use interface is generated by the data processing system for implementing a declarative modeling application (e.g., the design-canvas or graph pipeline). The graphical user interface comprises one or more tools configured to allow a user to build and visualize a graph model using declarative modeling. Declarative modeling is an approach to problem-solving and modeling that focuses on describing the problem and its constraints rather than prescribing a specific algorithm or procedure to solve it. In declarative modeling, the emphasis is on the "what" rather than the "how." In traditional procedural programming, the programmer specifies the step-by-step instructions to solve a problem. In contrast, declarative modeling allows users to express the problem in a high-level language or notation that describes the desired outcome or properties of the solution. The declarative modeling application provides constructs to represent constraints, relationships, and objectives in a concise and intuitive manner.

In step 1010, the data processing system obtains data to be used for the graph model from various data sources (i.e., heterogeneous sources of data). The data can be obtained in response to the user requesting data to be uploaded to the data processing system from the various data sources. The user can identify the various data sources and gather the data to be ingested into the declarative modeling application for generating a graph model. The identification and gathering of data may be facilitated through one or more ETL tools (part of the declarative modeling application) that essentially extract the data from its original source, transform the data by deduplicating it, combining it, and ensuring quality, to then loading the data into a target database or central repository for further use by the declarative modeling application.

In step 1015, declarative modeling input from a user is received via the graphical user interface. The input comprises a request to create at least two nodes representing logical entities within the data and at least one edge representing one or more relationships between the logical entities. Declarative modeling can be used to design a graph model and graph physicalization by the user describing the desired properties and constraints of the graph structure and layout. Declarative modeling approaches can be implemented using dedicated graph modeling languages, constraint programming frameworks, or graph layout libraries of the declarative modeling application that provide high-level constructs and optimization algorithms for graph modeling and visualization. These tools enable users to express their graph requirements in a declarative manner and automatically generate or optimize the graph model and physical layout based on the specified constraints and objectives.

In the declarative modeling approach for model design described herein, the user can define the nodes and edges of the graph and their attributes. This includes specifying the types of nodes and edges, their properties, and any constraints on their relationships. Declarative modeling allows the user to express constraints on the graph structure, such as specifying that certain nodes cannot be connected, or that certain edge types must have specific attributes. These constraints can be described using logical expressions or domain-specific languages within the declarative modeling application. The user can further specify the desired properties of the graph, such as connectivity requirements, hierarchies, or clustering patterns. These properties can guide the modeling process and help ensure that the resulting graph structure meets the intended criteria.

In the declarative modeling approach for graph physicalization described herein, the user can specify constraints on the layout of the graph, such as the arrangement of nodes and edges in a visual representation. This includes defining constraints on node positions, edge routing, alignment, or spacing requirements. The declarative modeling allows the user to express aesthetic criteria for graph visualization, such as minimizing edge crossings, maximizing symmetries, or balancing the distribution of nodes. These criteria can guide the graph physicalization process to create visually appealing layouts. The user can define optimization objectives to guide the physicalization process, such as minimizing the total edge length, maximizing the visibility of important nodes, or optimizing the use of available space. These objectives can be formulated using mathematical optimization techniques or objective functions provided by the declarative modeling application.

By leveraging declarative modeling, the user can focus on specifying the desired graph properties, constraints, and aesthetic criteria, while the underlying graph modeling or physicalization system handles the details of implementation. This separation of concerns enables greater flexibility, modularity, and adaptability in designing and manipulating graph structures and layouts.

In some instances, the input is received as drag and drop actions of user interface elements within the graphical use interface. The user interface elements represent the at least two nodes and the at least one edge. The user interface elements are registered in a model management and governance application with respective definition and execution points. The input may further comprise a request to create a data pipeline or rule under each of the at least two nodes. In response to the request to create, a unique identifier may be generated by the data processing system for the data pipeline or rule and the data pipeline or rule are registered against each node and/or each edge against the graph model in a metadata catalogue of a model management and governance application based on the unique identifier. The data pipeline or rule govern the node and/or the edge within the graph model and analysis of the graph model. The data pipeline states the sources of data to be used for modeling the nodes and edges within the graph model. For example, for a given node and relationships represented by edges connecting the node, the given node and edges are to be modeled based on data from a given sources of the one or more sources. The rules define conditions (e.g., patterns within the data to be observed), and actions to be taken when conditions are met. For example, a rule may state that if an amount of a transaction between two different entities in different geographies is above a predefined threshold, then that transaction should be flagged as a high-risk transaction. The rules essentially provide the weights or parameters for the edges and nodes for use in downstream analysis.

At step 1020, the data processing system generates the graph model based on the input from the user. The generating comprises parsing and validating the input, extract graph structure, creating the nodes and edges, applying the constraints, perform validation and error handling, and physicalizing the graph model within a database schema and/or visualizing the graph model within the graphical user interface. In some instances, the generating further comprises performing entity resolution.

More particularly, the data processing system can first parse and validate the declarative modeling input provided by the user. This involves checking the syntax, structure, and validity of the input to ensure it conforms to the requirements of the declarative modeling application. The data processing system can extract the relevant information from the declarative input to define the graph structure. This includes identifying node and edge definitions, their attributes, and any constraints or properties specified by the user. The extracted information forms the foundation of the graph model. The nodes and edges can then be connected via one or more data pipelines to the data sources based on the data used for the attributes or properties and relationships of the nodes and edges specified by the user. Based on the extracted information, the data processing system can create the nodes and edges of the graph model. Each node is instantiated with its specified attributes, and the edges are established based on the defined relationships between the nodes. Entity resolution can be applied during or concurrently with the creation nodes and edges. The entity resolution includes identifying duplicate nodes and/or edges and consolidating the duplicate nodes and/or edges under a single node and/or edge. If any constraints are specified in the declarative input, the data processing system can apply them to the graph model. This involves checking and enforcing the specified constraints, such as ensuring the connectivity requirements, validating attribute values, or enforcing constraints on node relationships.

Once generated, the data processing system can validate the generated graph model to ensure its internal consistency and adherence to the specified constraints. If any errors or inconsistencies are detected, appropriate error handling mechanisms can be employed to notify the user or provide feedback for corrective actions.

At step 1025, the data processing system provides feedback to the user about the generated graph model. This could include displaying the graph structure, attributes, and any identified issues or warnings. The data processing system can also provide visualization capabilities to present the graph model in a graphical or interactive form such as rendering the graph model on a display in a graphical user interface (e.g., the same or different graphical user interface used to design the graph model) for better understanding and exploration of the graph model.

At step 1030, the data processing system analyzes the data using the graph model. In some instances, the analysis comprises executing the rules on the data based on the nodes and edges connecting the nodes and obtaining information for a task (e.g., identify patterns of possible financial crime) based on the rules, data, and the graph model. In other instances, the analysis comprises generating embeddings from the graph model, training a machine-learning model on the embeddings, and obtaining a trained machine-learning model based on the training. In other instances, the analysis comprises generating embeddings from the graph model, inputting the embeddings into a trained machine-learning model based on the training, and obtaining a prediction for a task (e.g., identify patterns of possible financial crime) based on the data and the graph model.

At step 1035, the data processing system outputs results based on the analyzing. The output may comprise displaying the results, communicating the results, storing the results, or any combination thereof. In some instances, the output is the result of a query run against the data as part of the analyzing. In other instances, the output is results for a task (e.g., identity patterns of possible financial crime or alert/notification of a potential financial crime). In other instances, the result is trained machine-learning model. In other instances, the result is a prediction for a task made by a trained machine-learning model.

Illustrative Systems

Figure 11:
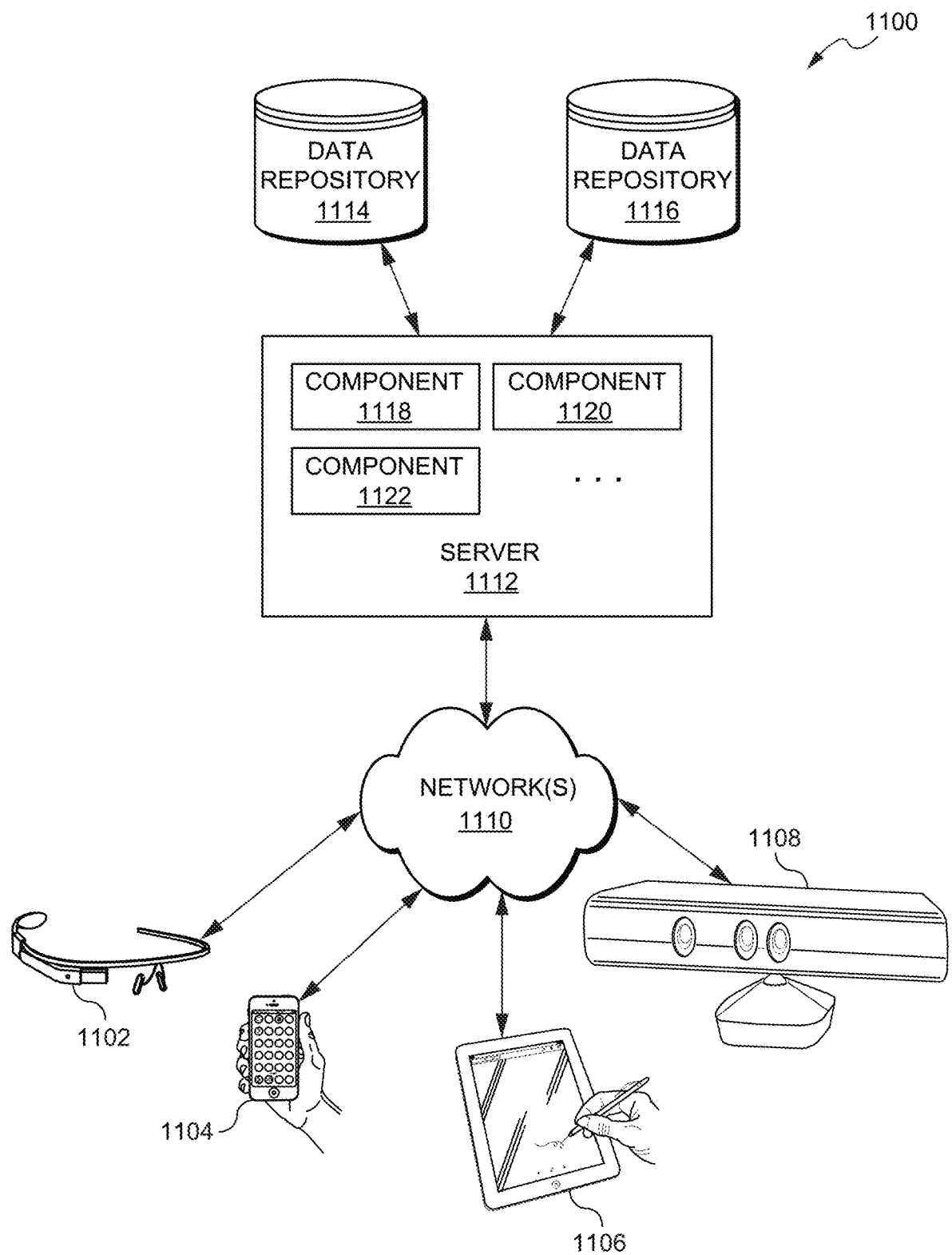
FIG. 11 depicts a simplified diagram of a distributed system for implementing various embodiments.

FIG. 11 depicts a simplified diagram of a distributed system 1100. In the illustrated example, distributed system 1100 includes one or more client computing devices 1102, 1104, 1106, and 1108, coupled to a server 1112 via one or more communication networks 1110. Clients computing devices 1102, 1104, 1106, and 1108 may be configured to execute one or more applications.

In various examples, server 1112 may be adapted to run one or more services or software applications that enable one or more embodiments described in this disclosure. In certain examples, server 1112 may also provide other services or software applications that may include non-virtual and virtual environments. In some examples, these services may be offered as web-based or cloud services, such as under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in FIG. 11, server 1112 may include one or more components 1118, 1120 and 1122 that implement the functions performed by server 1112. These components may include software components that may be executed by one or more processors, hardware components, or combinations thereof. It should be appreciated that various different system configurations are possible, which may be different from distributed system 1100. The example shown in FIG. 11 is thus one example of a distributed system for implementing an example system and is not intended to be limiting.

Users may use client computing devices 1102, 1104, 1106, and/or 1108 to execute one or more applications, which may generate one or more events or models that may then be implemented or serviced in accordance with the teachings of this disclosure. A client device may provide an interface that enables a user of the client device to interact with the client device. The client device may also output information to the user via this interface. Although FIG. 11 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1110 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1110 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 may include one or more virtual machines running virtual operating systems, or other computing architectures involving virtualization such as one or more flexible pools of logical storage devices that may be virtualized to maintain virtual storage devices for the server. In various examples, server 1112 may be adapted to run one or more services or software applications that provide the functionality described in the foregoing disclosure.

The computing systems in server 1112 may run one or more operating systems including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more data repositories 1114, 11111. These data repositories may be used to store data and other information in certain examples. For example, one or more of the data repositories 1114, 1116 may be used to store information such as information related to model performance or generated models used by server 1112 when performing various functions in accordance with various embodiments. Data repositories 1114, 1116 may reside in a variety of locations. For example, a data repository used by server 1112 may be local to server 1112 or may be remote from server 1112 and in communication with server 1112 via a network-based or dedicated connection. Data repositories 1114, 1116 may be of different types. In certain examples, a data repository used by server 1112 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1114, 1116 may also be used by applications to store application data. The data repositories used by applications may be of different types such as, for example, a key-value store repository, an object store repository, or a general storage repository supported by a file system.

Figure 12:
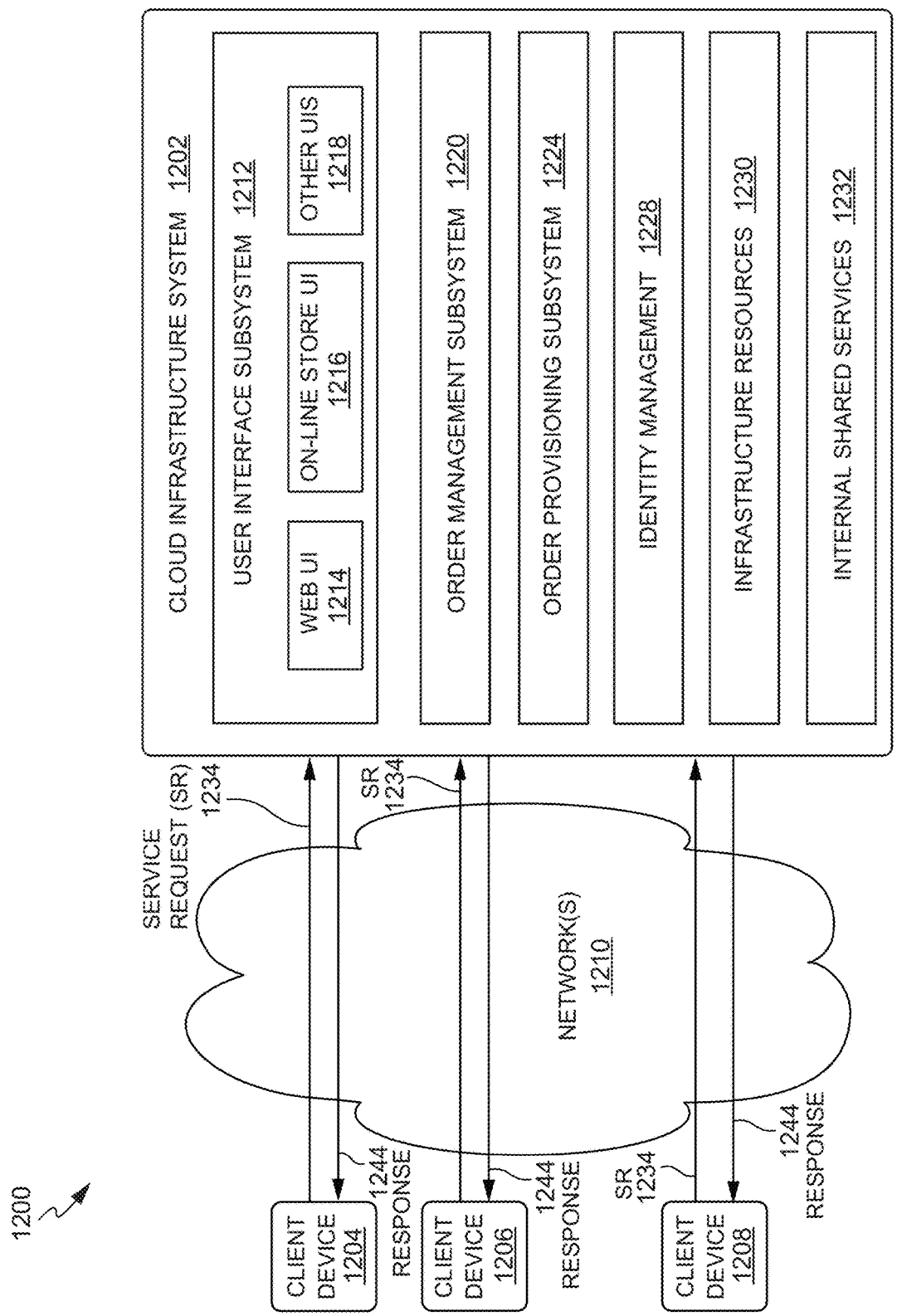
FIG. 12 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 12 is a simplified block diagram of a cloud-based system environment in which various services may be offered as cloud services in accordance with certain examples. In the example depicted in FIG. 12, cloud infrastructure system 1202 may provide one or more cloud services that may be requested by users using one or more client computing devices 1204, 1206, and 1208. Cloud infrastructure system 1202 may comprise one or more computers and/or servers that may include those described above for server 1112. The computers in cloud infrastructure system 1202 may be organized as general purpose computers, specialized server computers, server farms, server clusters, or any other appropriate arrangement and/or combination.

Network(s) 1210 may facilitate communication and exchange of data between clients 1204, 1206, and 1208 and cloud infrastructure system 1202. Network(s) 1210 may include one or more networks. The networks may be of the same or different types. Network(s) 1210 may support one or more communication protocols, including wired and/or wireless protocols, for facilitating the communications.

The example depicted in FIG. 12 is only one example of a cloud infrastructure system and is not intended to be limiting. It should be appreciated that, in some other examples, cloud infrastructure system 1202 may have more or fewer components than those depicted in FIG. 12, may combine two or more components, or may have a different configuration or arrangement of components. For example, although FIG. 12 depicts three client computing devices, any number of client computing devices may be supported in alternative examples.

The term cloud service is generally used to refer to a service that is made available to users on demand and via a communication network such as the Internet by systems (e.g., cloud infrastructure system 1202) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1202 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1202 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1202. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1202. Cloud infrastructure system 1202 then performs processing to provide the services requested in the customer's subscription order. For example, a user may use utterances to request the cloud infrastructure system to take a certain action (e.g., an intent), as described above, and/or provide services for a model-based system as described herein. Cloud infrastructure system 1202 may be configured to provide one or even multiple cloud services.

Cloud infrastructure system 1202 may provide the cloud services via different deployment models. In a public cloud model, cloud infrastructure system 1202 may be owned by a third party cloud services provider and the cloud services are offered to any general public customer, where the customer may be an individual or an enterprise. In certain other examples, under a private cloud model, cloud infrastructure system 1202 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1202 and the services provided may be shared by several organizations in a related community. Various other models such as hybrids of the above mentioned models may also be used.

Client computing devices 1204, 12011, and 1208 may be of different types (such as client computing devices 1102, 1104, 1106, and 1108 depicted in FIG. 11) and may be capable of operating one or more client applications. A user may use a client device to interact with cloud infrastructure system 1202, such as to request a service provided by cloud infrastructure system 1202. For example, a user may use a client device to request information or action from a model as described in this disclosure.

In some examples, the processing performed by cloud infrastructure system 1202 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1202 for generating, training, and/or deploying one or more models. The data used for this analysis may include structured data (e.g., data stored in a database or structured according to a structured model) and/or unstructured data (e.g., data blobs (binary large objects)).

As depicted in the example in FIG. 12, cloud infrastructure system 1202 may include infrastructure resources 1230 that are utilized for facilitating the provision of various cloud services offered by cloud infrastructure system 1202. Infrastructure resources 1230 may include, for example, processing resources, storage or memory resources, networking resources, and the like. In certain examples, the storage virtual machines that are available for servicing storage requested from applications may be part of cloud infrastructure system 1202. In other examples, the storage virtual machines may be part of different systems.

In certain examples, to facilitate efficient provisioning of these resources for supporting the various cloud services provided by cloud infrastructure system 1202 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1202 may itself internally use services 1232 that are shared by different components of cloud infrastructure system 1202 and which facilitate the provisioning of services by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1202 may comprise multiple subsystems. These subsystems may be implemented in software, or hardware, or combinations thereof. As depicted in FIG. 12, the subsystems may include a user interface subsystem 1212 that enables users or customers of cloud infrastructure system 1202 to interact with cloud infrastructure system 1202. User interface subsystem 1212 may include various different interfaces such as a web interface 1214, an online store interface 1216 where cloud services provided by cloud infrastructure system 1202 are advertised and are purchasable by a consumer, and other interfaces 1218. For example, a customer may, using a client device, request (service request 1234) one or more services provided by cloud infrastructure system 1202 using one or more of interfaces 1214, 1216, and 1218. For example, a customer may access the online store, browse cloud services offered by cloud infrastructure system 1202, and place a subscription order for one or more services offered by cloud infrastructure system 1202 that the customer wishes to subscribe to. The service request may include information identifying the customer and one or more services that the customer desires to subscribe to. For example, a customer may place a subscription order for a service offered by cloud infrastructure system 1202. As part of the order, the customer may provide information identifying a source of data for which a service is to be provided and optionally one or more credentials for the source of data.

In certain examples, such as the example depicted in FIG. 12, cloud infrastructure system 1202 may comprise an order management subsystem (OMS) 1220 that is configured to process the new order. As part of this processing, OMS 1220 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1220 may then invoke the order provisioning subsystem (OPS) 1224 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1224 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1202 as part of the provisioning process. Cloud infrastructure system 1202 may generate an application ID and select a storage virtual machine for an application from among storage virtual machines provided by cloud infrastructure system 1202 itself or from storage virtual machines provided by other systems other than cloud infrastructure system 1202.

Cloud infrastructure system 1202 may send a response or notification 1244 to the requesting customer to indicate when the requested service is now ready for use. In some instances, information (e.g., a link) may be sent to the customer that enables the customer to start using and availing the benefits of the requested services. In certain examples, for a customer requesting the service, the response may include a model ID generated by cloud infrastructure system 1202 and information identifying a model selected by cloud infrastructure system 1202 corresponding to the model ID.

Cloud infrastructure system 1202 may provide services to multiple customers. For each customer, cloud infrastructure system 1202 is responsible for managing information related to one or more subscription orders received from the customer, maintaining customer data related to the orders, and providing the requested services to the customer. Cloud infrastructure system 1202 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1202 may provide services to multiple customers in parallel. Cloud infrastructure system 1202 may store information for these customers, including possibly proprietary information. In certain examples, cloud infrastructure system 1202 comprises an identity management subsystem (IMS) 1228 that is configured to manage customer information and provide the separation of the managed information such that information related to one customer is not accessible by another customer. IMS 1228 may be configured to provide various security-related services such as identity services, such as information access management, authentication and authorization services, services for managing customer identities and roles and related capabilities, and the like.

Figure 13:
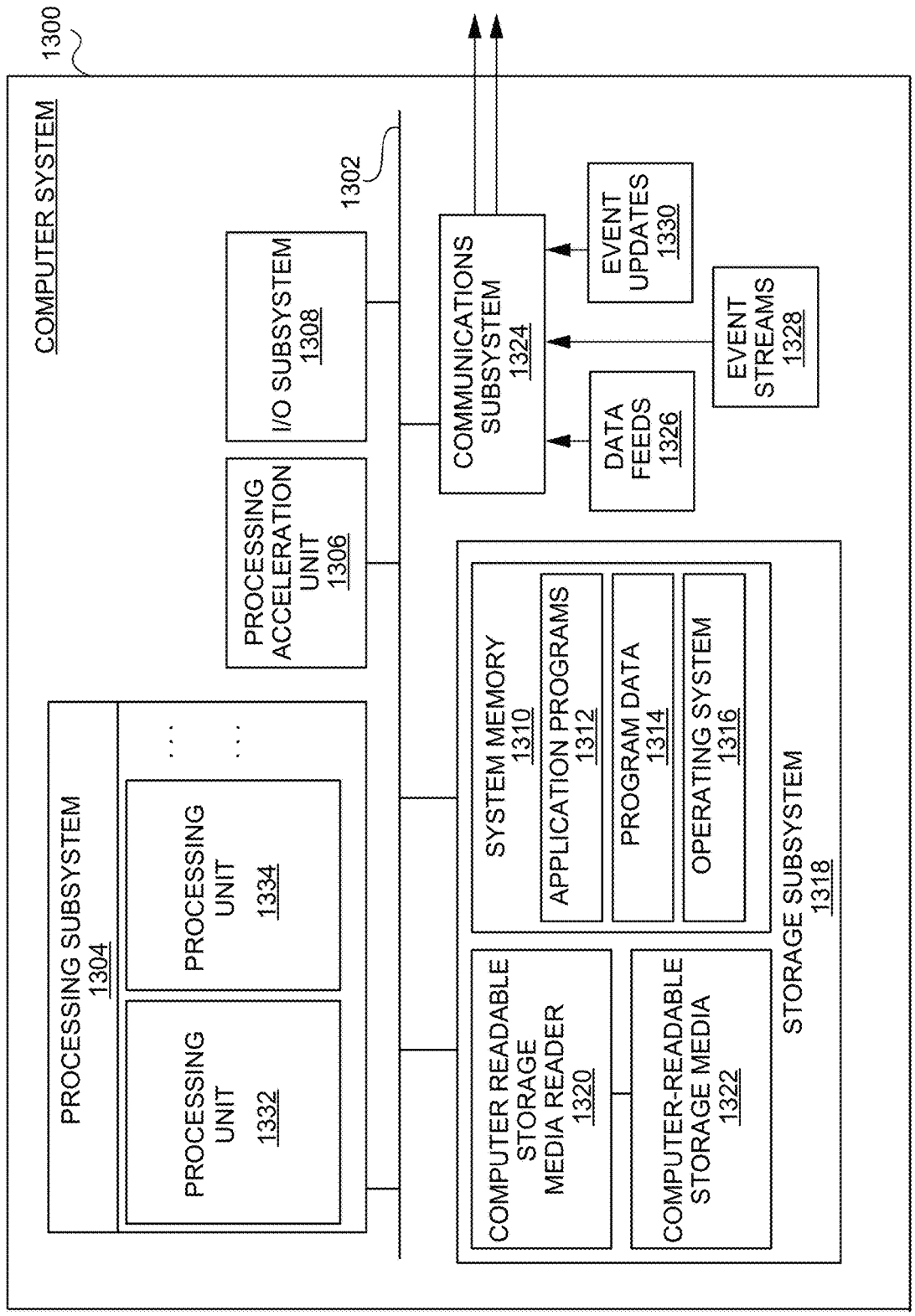
FIG. 13 illustrates an example computer system that may be used to implement various embodiments.

FIG. 13 illustrates an example of computer system 1300. In some examples, computer system 1300 may be used to implement any of the model pipeline systems within a distributed environment, and various servers and computer systems described above. As shown in FIG. 13, computer system 1300 includes various subsystems including a processing subsystem 1304 that communicates with a number of other subsystems via a bus subsystem 1302. These other subsystems may include a processing acceleration unit 1306, an I/O subsystem 1308, a storage subsystem 1318, and a communications subsystem 1324. Storage subsystem 1318 may include non-transitory computer-readable storage media including storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative examples of the bus subsystem may utilize multiple buses. Bus subsystem 1302 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1304 controls the operation of computer system 1300 and may comprise one or more processors, application specific integrated circuits (ASICs), or field programmable gate arrays (FPGAs). The processors may include be single core or multicore processors. The processing resources of computer system 1300 may be organized into one or more processing units 1332, 1334, etc. A processing unit may include one or more processors, one or more cores from the same or different processors, a combination of cores and processors, or other combinations of cores and processors. In some examples, processing subsystem 1304 may include one or more special purpose co-processors such as graphics processors, digital signal processors (DSPs), or the like. In some examples, some or all of the processing units of processing subsystem may be implemented using customized circuits, such as application specific integrated circuits (ASICs), or field programmable gate arrays (FPGAs).

In some examples, the processing units in processing subsystem 1304 may execute instructions stored in system memory 1310 or on computer readable storage media 1322. In various examples, the processing units may execute a variety of programs or code instructions and may maintain multiple concurrently executing programs or processes. At any given time, some or all of the program code to be executed may be resident in system memory 1310 and/or on computer-readable storage media 1322 including potentially on one or more storage devices. Through suitable programming, processing subsystem 1304 may provide various functionalities described above. In instances where computer system 1300 is executing one or more virtual machines, one or more processing units may be allocated to each virtual machine.

In certain examples, a processing acceleration unit 1306 may optionally be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term input device is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1300 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information and data that is used by computer system 1300. Storage subsystem 1318 provides a tangible non-transitory computer-readable storage medium for storing the basic programming and data constructs that provide the functionality of some examples. Storage subsystem 1318 may store software (e.g., programs, code modules, instructions) that when executed by processing subsystem 1304 provides the functionality described above. The software may be executed by one or more processing units of processing subsystem 1304. Storage subsystem 1318 may also provide authentication in accordance with the teachings of this disclosure.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM), dynamic random access memory (DRAM), and the like.

By way of example, and not limitation, as depicted in FIG. 13, system memory 1310 may load application programs 1312 that are being executed, which may include various applications such as Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1322 may store programming and data constructs that provide the functionality of some examples. Computer-readable media 1322 may provide storage of computer-readable instructions, data structures, program modules, and other data for computer system 1300. Software (programs, code modules, instructions) that, when executed by processing subsystem 1304 provides the functionality described above, may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1318 may also include a computer-readable storage media reader 1320 that may further be connected to computer-readable storage media 1322. Reader 1320 may receive and be configured to read data from a memory device such as a disk, a flash drive, etc.

In certain examples, computer system 1300 may support virtualization technologies, including but not limited to virtualization of processing and memory resources. For example, computer system 1300 may provide support for executing one or more virtual machines. In certain examples, computer system 1300 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1300. Accordingly, multiple operating systems may potentially be run concurrently by computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices. For example, when computer system 1300 is used to implement the architecture depicted in FIG. 1, the communication subsystem may be used to communicate with the canvas.

Communication subsystem 1324 may support both wired and/or wireless communication protocols. In certain examples, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1324 may provide wired network connectivity (e.g., Ethernet) in addition to or instead of a wireless interface.

Communication subsystem 1324 may receive and transmit data in various forms. In some examples, in addition to other forms, communications subsystem 1324 may receive input communications in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1324 may be configured to receive data in the form of continuous data streams, which may include event streams 1328 of real-time events and/or event updates 1330, which may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1324 may also be configured to communicate data from computer system 1300 to other computer systems or networks. The data may be communicated in various different forms such as structured and/or unstructured data feeds 1326, event streams 1328, event updates 1330, and the like to one or more databases that may be in communication with one or more streaming data source computers coupled to computer system 1300.

Computer system 1300 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed:

1. A computer-implemented method comprising:
generating, by a processor, a graphical user interface for implementing a declarative modeling application, wherein the graphical user interface comprises one or more tools configured to allow a user to build and visualize a graph model using declarative modeling;
obtaining, by the processor, data for the graph model based on an input from the user received via the graphical user interface;
receiving, by the processor, a declarative modeling input with respect to the data, from the user via the graphical user interface, wherein the declarative modeling input comprises:
a request to create (1) one or more pairs of nodes, each of the one or more pairs of nodes respectively representing one or more pairs of logical entities identified within the data, and (2) for each pair of nodes of the one or more pairs of nodes, an associated edge representing a relationship between the logical entities of a pair of logical entities of the one or more pairs of logical entities that corresponds to the pair of nodes, wherein the request specifies, for each pair of nodes, (a) types of nodes and a type of the associated edge, (b) properties for the nodes and the associated edge, and (c) constraints on a layout of the graph model including an arrangement of the one or more pairs of nodes and one or more associated edges in a visual representation, and
a request to create a data pipeline among data pipelines for each of the nodes of the one or more pairs of nodes,
wherein:
in response to the request to create the data pipeline, a unique identifier is generated for each data pipeline associated with each node of the graph model in a metadata catalogue of a model management and governance application, and
each data pipeline is registered against a corresponding node in the metadata catalogue based on the unique identifier, with a respective definition that describes an associated data source to be used for modeling;
generating, by the processor, the graph model based on the declarative modeling input and the data for the graph model, wherein the generating comprises:
extracting information from the declarative modeling input to define a graph structure, the extracting comprising, for each pair of nodes, identifying the types of the nodes and the type of the associated edge, the properties for the nodes and the associated edge, and the constraints for the nodes and the associated edge,
for each pair of nodes, connecting the nodes and the associated edge to data sources, for obtaining input data, via the data pipelines based on the properties for the nodes and the associated edge and the relationship,
wherein:
a first node of a pair of nodes among the one or more pairs of nodes is respectively connected by a first data pipeline and a second data pipeline, of the data pipelines, to a first data source and a second data source different from one another,
a second node of a same pair of nodes is respectively connected by a third data pipeline and a fourth data pipeline, of the data pipelines, to a third data source and a fourth data source different from one another and from the first data source and the second data source, and
each of the first data pipeline, the second data pipeline, the third data pipeline, and the fourth data pipeline is registered against a corresponding node in the metadata catalogue based on the unique identifier, respectively, along with a respective definition describing each of the first data source, the second data source, the third data source, and the fourth data source, and
creating the graph model comprising the one or more pairs of nodes, the nodes of each pair of nodes being connected by the associated edge established based on the relationship between the logical entities of a corresponding pair of logical entities, wherein each of the nodes of each pair of nodes is instantiated with the properties;
rendering, by the processor, the graph model on the graphical user interface;
analyzing, by the processor, the input data using the graph model, wherein the analyzing comprises: (i) executing rules on the input data based on the one or more pairs of nodes and the one or more associated edges and obtaining information for a task based on the rules, the input data, and the graph model, (ii) generating embeddings from the graph model, training a machine-learning model using the embeddings, and obtaining a trained machine-learning model based on the training, (iii) generating the embeddings from the graph model, inputting the embeddings into the trained machine-learning model, and obtaining a prediction for the task based on the input data and the graph model, or (iv) any combination thereof, and
outputting, by the processor, results based on the analyzing.

2. The computer-implemented method of claim 1, wherein:
the declarative modeling input is received as drag and drop actions of user interface elements within the graphical use interface,
the user interface elements represent the nodes of the one or more pairs of nodes and the one or more associated edges, and
the user interface elements are registered in the model management and governance application with respective definition and execution points.

3. The computer-implemented method of claim 1, wherein:
the declarative modeling input further comprises a request to create a rule under each of the nodes having the unique identifier of the one or more pairs of nodes,
the rule is registered against each node and/or each edge against the graph model in the metadata catalogue based on the unique identifier, and
the rule governs at least one from among each node and each edge within the graph model and analysis of the graph model.

4. The computer-implemented method of claim 1, wherein the outputting comprises displaying the results, communicating the results, storing the results, or any combination thereof.

5. The computer-implemented method of claim 1, wherein the results comprise: (i) a result of a query run against the data as part of the analyzing, (ii) the information for the task, (iii) the trained machine-learning model, (iv) the prediction from the trained machine-learning model, or (v) any combination thereof.

6. The computer-implemented method of claim 1, wherein generating the graph model further comprises performing entity resolution on the graph model, and wherein performing the entity resolution comprises identifying duplicate nodes and/or edges and consolidating the duplicate nodes and/or edges under a single node and/or edge.

7. A system comprising:
one or more processors;
a memory coupled to the one or more processors, the memory storing a plurality of instructions that, when executed by the one or more processors, cause the one or more processors to perform operations including:
generating a graphical user interface for implementing a declarative modeling application, wherein the graphical user interface comprises one or more tools configured to allow a user to build and visualize a graph model using declarative modeling;
obtaining data for the graph model based on an input from the user received via the graphical user interface;
receiving a declarative modeling input with respect to the data, from the user via the graphical user interface, wherein the declarative modeling input comprises:
a request to create (1) one or more pairs of nodes, each of the one or more pairs of nodes respectively representing one or more pairs of logical entities identified within the data, and (2) for each pair of nodes of the one or more pairs of nodes, an associated edge representing a relationship between the logical entities of a pair of logical entities of the one or more pairs of logical entities that corresponds to the pair of nodes, wherein the request specifies, for each pair of nodes, (a) types of nodes and a type of the associated edge, (b) properties for the nodes and the associated edge, and (c) constraints on a layout of the graph model including an arrangement of the one or more pairs of nodes and one or more associated edges in a visual representation, and
a request to create a data pipeline among data pipelines for each of the nodes of the one or more pairs of nodes,
wherein:
in response to the request to create the data pipeline, a unique identifier is generated for each data pipeline associated with each node of the graph model in a metadata catalogue of a model management and governance application, and
each data pipeline is registered against a corresponding node in the metadata catalogue based on the unique identifier, with a respective definition that describes an associated data source to be used for modeling;
generating the graph model based on the declarative modeling input and the data for the graph model, wherein the generating includes:
extracting information from the declarative modeling input to define a graph structure, the extracting including, for each pair of nodes, identifying the types of the nodes and the type of the associated edge, the properties for the nodes and the associated edge, and the constraints for the nodes and the associated edge,
for each pair of nodes, connecting the nodes and the associated edge to data sources, for obtaining input data, via the data pipelines based on the properties for the nodes and the associated edge and the relationship,
wherein:
a first node of a pair of nodes among the one or more pairs of nodes is respectively connected by a first data pipeline and a second data pipeline, of the data pipelines, to a first data source and a second data source different from one another,
a second node of a same pair of nodes is respectively connected by a third data pipeline and a fourth data pipeline, of the data pipelines, to a third data source and a fourth data source different from one another and from the first data source and the second data source, and
each of the first data pipeline, the second data pipeline, the third data pipeline, and the fourth data pipeline is registered against a corresponding node in the metadata catalogue based on the unique identifier, respectively, along with a respective definition describing each of the first data source, the second data source, the third data source, and the fourth data source, and
creating the graph model comprising the one or more pairs of nodes, the nodes of each pair of nodes being connected by the associated edge established based on the relationship between the logical entities of a corresponding pair of logical entities, wherein each of the nodes of each pair of nodes is instantiated with the properties;
rendering the graph model on the graphical user interface;
analyzing the input data using the graph model, wherein the analyzing includes: (i) executing rules on the input data based on the one or more pairs of nodes and the one or more associated edges and obtaining information for a task based on the rules, the input data, and the graph model, (ii) generating embeddings from the graph model, training a machine-learning model using the embeddings, and obtaining a trained machine-learning model based on the training, (iii) generating the embeddings from the graph model, inputting the embeddings into the trained machine-learning model, and obtaining a prediction for the task based on the input data and the graph model, or (iv) any combination thereof; and
outputting results based on the analyzing.

8. The system of claim 7, wherein:
the declarative modeling input is received as drag and drop actions of user interface elements within the graphical use interface,
the user interface elements represent the nodes of the one or more pairs of nodes and the one or more associated edges, and
the user interface elements are registered in the model management and governance application with respective definition and execution points.

9. The system of claim 7, wherein:
the declarative modeling input further comprises a request to create a rule under each of the nodes having the unique identifier of the one or more pairs of nodes,
the rule is registered against each node and/or each edge against the graph model in the metadata catalogue based on the unique identifier, and the rule governs at least one from among each node and each edge within the graph model and analysis of the graph model.

10. The system of claim 7, wherein the outputting includes displaying the results, communicating the results, storing the results, or any combination thereof.

11. The system of claim 7, wherein the results comprise: (i) a result of a query run against the data as part of the analyzing, (ii) the information for the task, (iii) the trained machine-learning model, (iv) the prediction from the trained machine-learning model, or (v) any combination thereof.

12. The system of claim 7, wherein generating the graph model further includes performing entity resolution on the graph model, and wherein performing the entity resolution includes identifying duplicate nodes and/or edges and consolidating the duplicate nodes and/or edges under a single node and/or edge.

13. A non-transitory computer-readable memory storing a plurality of instructions that, when executed by one or more processors, cause the one or more processors to perform operations including:
generating a graphical user interface for implementing a declarative modeling application, wherein the graphical user interface comprises one or more tools configured to allow a user to build and visualize a graph model using declarative modeling;
obtaining data for the graph model based on an input from the user received via the graphical user interface;
receiving a declarative modeling input with respect to the data, from the user via the graphical user interface, wherein the declarative modeling input comprises:
 a request to create (1) one or more pairs of nodes, each of the one or more pairs of nodes respectively representing one or more pairs of logical entities identified within the data, and (2) for each pair of nodes of the one or more pairs of nodes, an associated edge representing a relationship between the logical entities of a pair of logical entities of the one or more pairs of logical entities that corresponds to the pair of nodes, wherein the request specifies, for each pair of nodes, (a) types of nodes and a type of the associated edge, (b) properties for the nodes and the associated edge, and (c) constraints on a layout of the graph model including an arrangement of the one or more pairs of nodes and one or more associated edges in a visual representation, and
 a request to create a data pipeline among data pipelines for each of the nodes of the one or more pairs of nodes,
wherein:
 in response to the request to create the data pipeline, a unique identifier is generated for each data pipeline associated with each node of the graph model in a metadata catalogue of a model management and governance application, and
 each data pipeline is registered against a corresponding node in the metadata catalogue based on the unique identifier, with a respective definition that describes an associated data source to be used for modeling;
generating the graph model based on the declarative modeling input and the data for the graph model, wherein the generating includes:
 extracting information from the declarative modeling input to define a graph structure, the extracting including, for each pair of nodes, identifying the types of the nodes and the type of the associated edge, the properties for the nodes and the associated edge, and the constraints for the nodes and the associated edge,
 for each pair of nodes, connecting the nodes and the associated edge to data sources, for obtaining input data, via the data pipelines based on the properties for the nodes and the associated edge and the relationship,
 wherein:
  a first node of a pair of nodes among the one or more pairs of nodes is respectively connected by a first data pipeline and a second data pipeline, of the data pipelines, to a first data source and a second data source different from one another,
  a second node of a same pair of nodes is respectively connected by a third data pipeline and a fourth data pipeline, of the data pipelines, to a third data source and a fourth data source different from one another and from the first data source and the second data source, and
  each of the first data pipeline, the second data pipeline, the third data pipeline, and the fourth data pipeline is registered against a corresponding node in the metadata catalogue based on the unique identifier, respectively, along with a respective definition describing each of the first data source, the second data source, the third data source, and the fourth data source, and
 creating the graph model comprising the one or more pairs of nodes, the nodes of each pair of nodes being connected by the associated edge established based on the relationship between the logical entities of a corresponding pair of logical entities, wherein each of the nodes of each pair of nodes is instantiated with the properties;
rendering the graph model on the graphical user interface;
analyzing the input data using the graph model, wherein the analyzing includes: (i) executing rules on the input data based on the one or more pairs of nodes and the one or more associated edges and obtaining information for a task based on the rules, the input data, and the graph model, (ii) generating embeddings from the graph model, training a machine-learning model using the embeddings, and obtaining a trained machine-learning model based on the training, (iii) generating the embeddings from the graph model, inputting the embeddings into the trained machine-learning model, and obtaining a prediction for the task based on the input data and the graph model, or (iv) any combination thereof; and
outputting results based on the analyzing.

14. The non-transitory computer-readable memory of claim 13, wherein:
the declarative modeling input is received as drag and drop actions of user interface elements within the graphical use interface,
the user interface elements represent the nodes of the one or more pairs of nodes and the one or more associated edges, and
the user interface elements are registered in the model management and governance application with respective definition and execution points.

15. The non-transitory computer-readable memory of claim 13, wherein:
the declarative modeling input further comprises a request to create a rule under each of the nodes having the unique identifier of the one or more pairs of nodes, the rule is registered against each node and/or each edge against the graph model in the metadata catalogue based on the unique identifier, and the rule governs at least one from among each node and each edge within the graph model and analysis of the graph model.

16. The non-transitory computer-readable memory of claim 13, wherein the outputting includes displaying the results, communicating the results, storing the results, or any combination thereof.

17. The non-transitory computer-readable memory of claim 13, wherein the results comprise: (i) a result of a query run against the data as part of the analyzing, (ii) the information for the task, (iii) the trained machine-learning model, (iv) the prediction from the trained machine-learning model, or (v) any combination thereof.

18. The computer-implemented method of claim 1, further comprising:

analyzing, by the processor, the data to identify a plurality of logical entities including the one or more pairs of logical entities, the logical entities of each of the one or more pairs of logical entities are connected by the relationship.

* * * * *